(12) United States Patent
Kostrzewa et al.

(10) Patent No.: US 9,900,526 B2
(45) Date of Patent: Feb. 20, 2018

(54) TECHNIQUES TO COMPENSATE FOR CALIBRATION DRIFTS IN INFRARED IMAGING DEVICES

(71) Applicant: FLIR Systems, Inc., Wilsonville, OR (US)

(72) Inventors: Joseph Kostrzewa, Buellton, CA (US); Vu L. Nguyen, Goleta, CA (US); Theodore R. Hoelter, Goleta, CA (US); Nicholas Högasten, Santa Barbara, CA (US); Mark Nussmeier, Goleta, CA (US); Eric A. Kurth, Santa Barbara, CA (US); Katrin Strandemar, Rimbo (SE); Pierre Boulanger, Goleta, CA (US); Barbara Sharp, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 149 days.

(21) Appl. No.: 14/749,886

(22) Filed: Jun. 25, 2015

(65) Prior Publication Data

US 2015/0312488 A1   Oct. 29, 2015

Related U.S. Application Data

(63) Continuation of application No. PCT/US2013/078369, filed on Dec. 30, 2013, and a
(Continued)

(51) Int. Cl.
*H04N 5/351* (2011.01)
*H04N 5/335* (2011.01)
(Continued)

(52) U.S. Cl.
CPC ........... *H04N 5/351* (2013.01); *H04N 5/2176* (2013.01); *H04N 5/2253* (2013.01);
(Continued)

(58) Field of Classification Search
None
See application file for complete search history.

(56) References Cited

U.S. PATENT DOCUMENTS 2,764,055 A   9/1956   Clemens et al.
6,297,794 B1   10/2001   Tsubouchi et al.
(Continued)

FOREIGN PATENT DOCUMENTS

CA   2764055   7/2012
CN   2874947   2/2007
(Continued)

OTHER PUBLICATIONS

F. Marcotte, P. Tremblay, & V. Farley, "Infrared camera NUC and calibration: comparison of advanced methods" 8706 Proc. SPIE 301-310 (Jun. 12, 2013).*
(Continued)

*Primary Examiner* — David N Werner
(74) *Attorney, Agent, or Firm* — Haynes and Boone, LLP

(57) ABSTRACT

Various techniques are provided to compensate for and/or update ineffective (e.g., stale) calibration terms due to calibration drifts in infrared imaging devices. For example, a virtual-shutter non-uniformity correction (NUC) procedure may be initiated to generate NUC terms to correct non-uniformities when appropriate triggering events and/or conditions are detected that may indicate presence of an object or scene to act as a shutter (e.g., a virtual shutter). Scene-based non-uniformity correction (SBNUC) may be performed during image capturing operations of the infrared imaging device, for example, when a virtual-shutter scene is
(Continued)

not available. Further, snapshots of calibration data (e.g., NUC terms) produced during the virtual-shutter NUC procedure, the SBNUC process, and/or other NUC process may be taken. Such snapshots may be utilized to provide useful NUC data when the infrared imaging device starts up or is otherwise reactivated, so that the SBNUC or other NUC methods may produce effective results soon after the start-up. Such snapshots may also be utilized to update ineffective calibration terms.

26 Claims, 16 Drawing Sheets

Related U.S. Application Data continuation-in-part of application No. 14/101,245, filed on Dec. 9, 2013, application No. 14/101,245, which is a continuation of application No. PCT/US2012/041744, filed on Jun. 8, 2012, said application No. PCT/US2013/078369 is a continuation-in-part of application No. 14/099,818, filed on Dec. 6, 2013, application No. 14/749,886, which is a continuation-in-part of application No. 14/099,818, which is a continuation of application No. PCT/US2012/041749, filed on Jun. 8, 2012, said application No. PCT/US2013/078369 is a continuation-in-part of application No. 14/101,258, filed on Dec. 9, 2013, application No. 14/749,886, which is a continuation-in-part of application No. 14/101,258, which is a continuation of application No. PCT/US2012/041739, filed on Jun. 8, 2012, said application No. PCT/US2013/078369 is a continuation-in-part of application No. 14/138,058, filed on Dec. 21, 2013, application No. 14/749,886, which is a continuation-in-part of application No. 14/138,058, said application No. PCT/US2013/078369 is a continuation-in-part of application No. 14/138,040, filed on Dec. 21, 2013, application No. 14/749,886, which is a continuation-in-part of application No. 14/138,040, said application No. PCT/US2013/078369 is a continuation-in-part of application No. 14/138,052, filed on Dec. 21, 2013, application No. 14/749,886, which is a continuation-in-part of application No. 14/138,052.

(60) Provisional application No. 61/747,947, filed on Dec. 31, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/748,018, filed on Dec. 31, 2012, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012.

(51) Int. Cl.
| | |
|---|---|
| *H04N 5/235* | (2006.01) |
| *H04N 5/33* | (2006.01) |
| *H04N 17/00* | (2006.01) |
| *H04N 5/365* | (2011.01) |
| *H04N 5/378* | (2011.01) |
| *H04N 5/225* | (2006.01) |
| *H04N 5/217* | (2011.01) |
| *H04N 101/00* | (2006.01) |

(52) U.S. Cl.
CPC .......... *H04N 5/2257* (2013.01); *H04N 5/2351* (2013.01); *H04N 5/33* (2013.01); *H04N 5/332* (2013.01); *H04N 5/335* (2013.01); *H04N 5/3656* (2013.01); *H04N 5/3658* (2013.01); *H04N 5/378* (2013.01); *H04N 17/002* (2013.01); *H04N 2101/00* (2013.01)

(56) References Cited

U.S. PATENT DOCUMENTS

| | | |
|---|---|---|
| 6,330,371 B1 | 12/2001 | Chen et al. |
| 6,348,951 B1 | 2/2002 | Kim |
| 6,396,543 B1 | 5/2002 | Shin et al. |
| 6,424,843 B1 | 7/2002 | Reitmaa et al. |
| 6,444,983 B1 | 9/2002 | McManus et al. |
| 6,633,231 B1 | 10/2003 | Okamoto et al. |
| 6,681,120 B1 | 1/2004 | Kim |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang Li |
| 7,084,857 B2 | 8/2006 | Lieberman et al. |
| 7,135,646 B2 | 11/2006 | Kaushal |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,616,877 B2 | 11/2009 | Zarnowski et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,274,050 B2 * | 9/2012 | Grimberg ............... G01J 5/522 |
| | | 250/336.1 |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |

(56) References Cited

U.S. PATENT DOCUMENTS

| | | |
|---|---|---|
| 2003/0112871 A1 | 6/2003 | Demos |
| 2003/0122957 A1 | 7/2003 | Emme |
| 2003/0198400 A1 | 10/2003 | Alderson et al. |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0089241 A1 | 4/2005 | Kawanishi et al. |
| 2005/0068333 A1 | 5/2005 | Nakahashi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0103742 A1* | 5/2007 | Ernandes ............ H04N 1/40006 358/504 |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0112594 A1* | 5/2008 | Williams ................ F41G 7/007 382/107 |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0173816 A1* | 7/2008 | Everett .................. B60R 11/04 250/332 |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0220193 A1 | 9/2010 | Hogasten et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0169866 A1* | 7/2012 | Schmidt ................ H04N 5/33 348/135 |
| 2012/0184252 A1 | 7/2012 | Hirsch |
| 2012/0211648 A1* | 8/2012 | Linsacum ............... H04N 5/33 250/252.1 |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |

(56) References Cited

FOREIGN PATENT DOCUMENTS

| | | |
|---|---|---|
| DE | 102006057431 | 6/2008 |
| EP | 1253779 | 10/2002 |
| EP | 1 983 485 | 10/2008 |
| EP | 2 136 554 | 12/2009 |
| EP | 2477391 | 7/2012 |
| JP | 19970275518 | 4/1999 |
| JP | 2004 004465 | 1/2004 |
| JP | 2004048571 | 2/2004 |
| JP | 2004 241491 | 8/2004 |
| JP | 2006098098 | 4/2006 |
| JP | 2006105655 | 4/2006 |
| JP | 2007006475 | 1/2007 |
| JP | 2007 267035 | 10/2007 |
| JP | 2007325842 | 12/2007 |
| JP | 2010181324 | 8/2010 |
| JP | 2012231309 | 11/2012 |
| KR | 20000024751 | 5/2000 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050031519 | 4/2005 |
| KR | 20050033308 | 4/2005 |
| KR | 20050044783 | 5/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100645746 | 11/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100667544 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |

(56) References Cited

FOREIGN PATENT DOCUMENTS

| | | |
|---|---|---|
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 20100022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/096211 | 9/2006 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2012/170949 | 12/2012 |
| WO | WO 2012/170953 | 12/2012 |
| WO | WO 2012/170954 | 12/2012 |

OTHER PUBLICATIONS

P. Tremblay, L. Belhumeur, M. Chamberland, A. Villemaire, P. Dubois, F. Marcotte, C. Belzile, V. Farley, & P. Lagueux, "Pixel-wise real-time advanced calibration method for thermal infrared cameras", 7662 Proc. SPIE 1201-11 (May 11, 2010).*

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

TECHNIQUES TO COMPENSATE FOR CALIBRATION DRIFTS IN INFRARED IMAGING DEVICES

CROSS-REFERENCE TO RELATED APPLICATIONS

This application is a continuation of International Patent Application No. PCT/US2013/078369 filed Dec. 30, 2013 and entitled "TECHNIQUES TO COMPENSATE FOR CALIBRATION DRIFTS IN INFRARED IMAGING DEVICES" which is hereby incorporated by reference in its entirety.

International Patent Application No. PCT/US2013/078369 claims the benefit of U.S. Provisional Patent Application No. 61/747,947 filed Dec. 31, 2012 and entitled "TECHNIQUES TO COMPENSATE FOR CALIBRATION DRIFTS IN INFRARED IMAGING DEVICES" which is hereby incorporated by reference in its entirety.

International Patent Application No. PCT/US2013/078369 is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

This application is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078369 is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078369 is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/078369 is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

This application is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

International Patent Application No. PCT/US2013/078369 is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

This application is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

International Patent Application No. PCT/US2013/078369 is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

This application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to infrared imaging devices, and more particularly, for example, to techniques to compensate for calibration drifts associated with such devices.

BACKGROUND

For many infrared imaging devices, various calibration procedures may be performed during manufacturing, testing, and/or operation to correct non-uniformities or otherwise reduce noise associated with the infrared imaging devices. Calibration data (also referred to as calibration terms) produced during such calibration procedures are typically stored in a non-volatile memory and applied to the infrared imaging devices and/or captured images to correct non-uniformities or otherwise reduce noise that may appear in the captured images. However, as various characteristics of various components of the infrared imaging devices change with passage of time and/or with use, the calibration terms gradually become stale (e.g., less effective), resulting in a calibration drift.

To correct calibration drifts, infrared imaging devices typically need to be recalibrated at a calibration station and/or using an internal calibration shutter mechanism embedded into the infrared imaging devices. However, a calibration station may be unavailable, or using one may be cumbersome. Internal calibration shutter mechanisms may also be unavailable for many infrared imaging devices, especially for small form factor and/or low cost devices.

Some infrared imaging devices may be capable of performing shutterless non-uniformity correction (NUC) methods using images captured during operation of the device, so as to further correct non-uniformities or otherwise reduce noise in addition to applying the calibration terms. However, such methods may not be sufficient to quickly compensate for calibration drifts, because as the calibration drifts worsen it may take an unacceptably long time for the shutterless NUC methods to produce reasonable results after the infrared imaging devices start capturing images.

SUMMARY

Various techniques are provided to compensate for and/or update ineffective (e.g., stale) calibration terms due to calibration drifts in infrared imaging devices. For example, a virtual-shutter non-uniformity correction (NUC) procedure may be initiated to generate NUC terms to correct non-uniformities when appropriate triggering events and/or conditions are detected that may indicate presence of an object or scene to act as a shutter (e.g., a virtual shutter). Scene-based non-uniformity correction (SBNUC) may be performed during image capturing operations of the infrared imaging device, for example, when a virtual-shutter scene is not available. Further, snapshots of calibration data (e.g., NUC terms) produced during the virtual-shutter NUC procedure, the SBNUC process, and/or other NUC process may be taken. Such snapshots may be utilized to provide useful NUC data when the infrared imaging device starts up or is otherwise reactivated, so that the SBNUC or other NUC methods may produce effective results soon after the startup. Such snapshots may also be utilized to update ineffective calibration terms.

In one embodiment, a method includes receiving image frames of a scene captured by a focal plane array (FPA) of an infrared imaging device; obtaining non-uniformity correction (NUC) terms to reduce at least some of noise introduced by the infrared imaging device, wherein the NUC terms are obtained by processing at least one of the image frames of the scene; and storing the obtained NUC terms as one or more snapshots of NUC terms.

In another embodiment, a device includes an infrared imaging device comprising a focal plane array (FPA) adapted to capture image frames of a scene; a memory adapted to store information; and a processor adapted to communicate with the infrared imaging device and the memory, the processor further adapted to: obtain non-uniformity correction (NUC) terms to reduce at least some of noise introduced by the infrared imaging device, wherein the NUC terms are obtained by processing at least one of the image frames of the scene, and store the obtained NUC terms as one or more snapshots of NUC terms in the memory.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
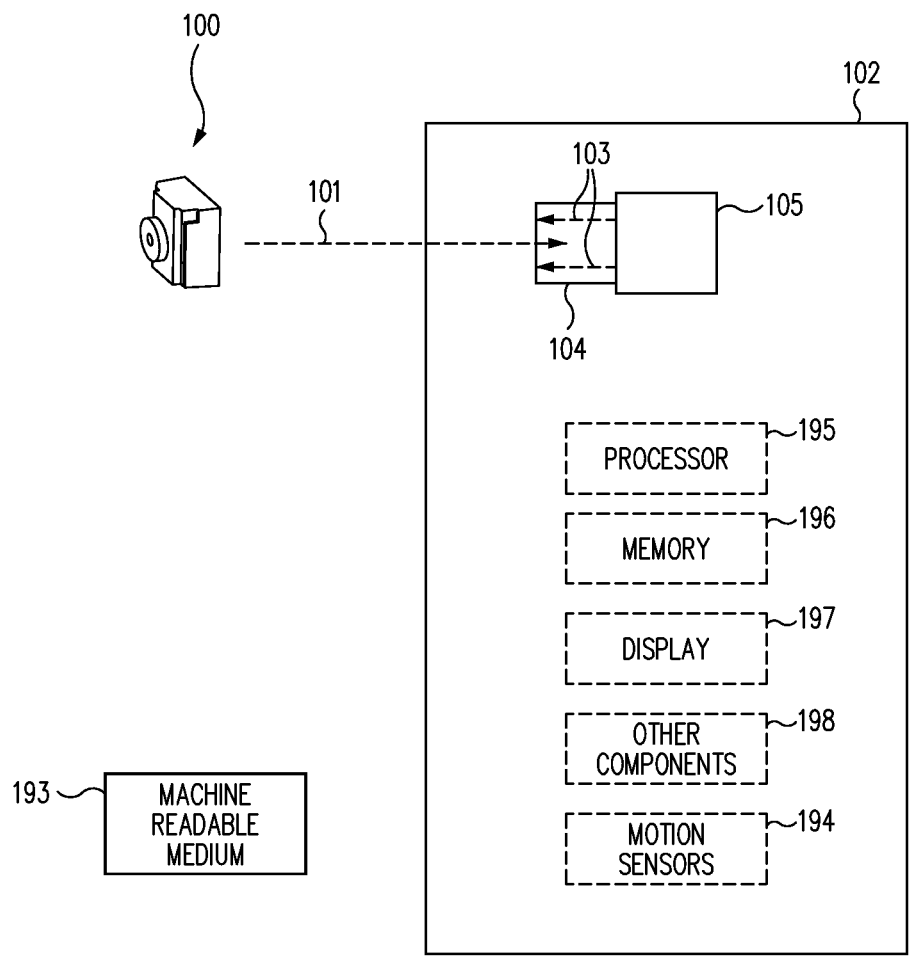
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
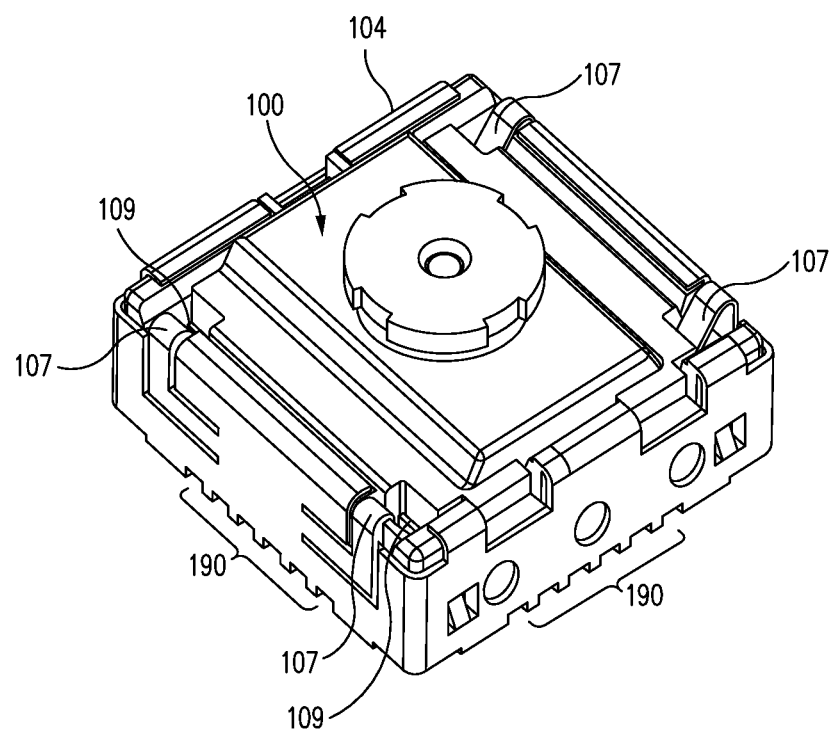
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
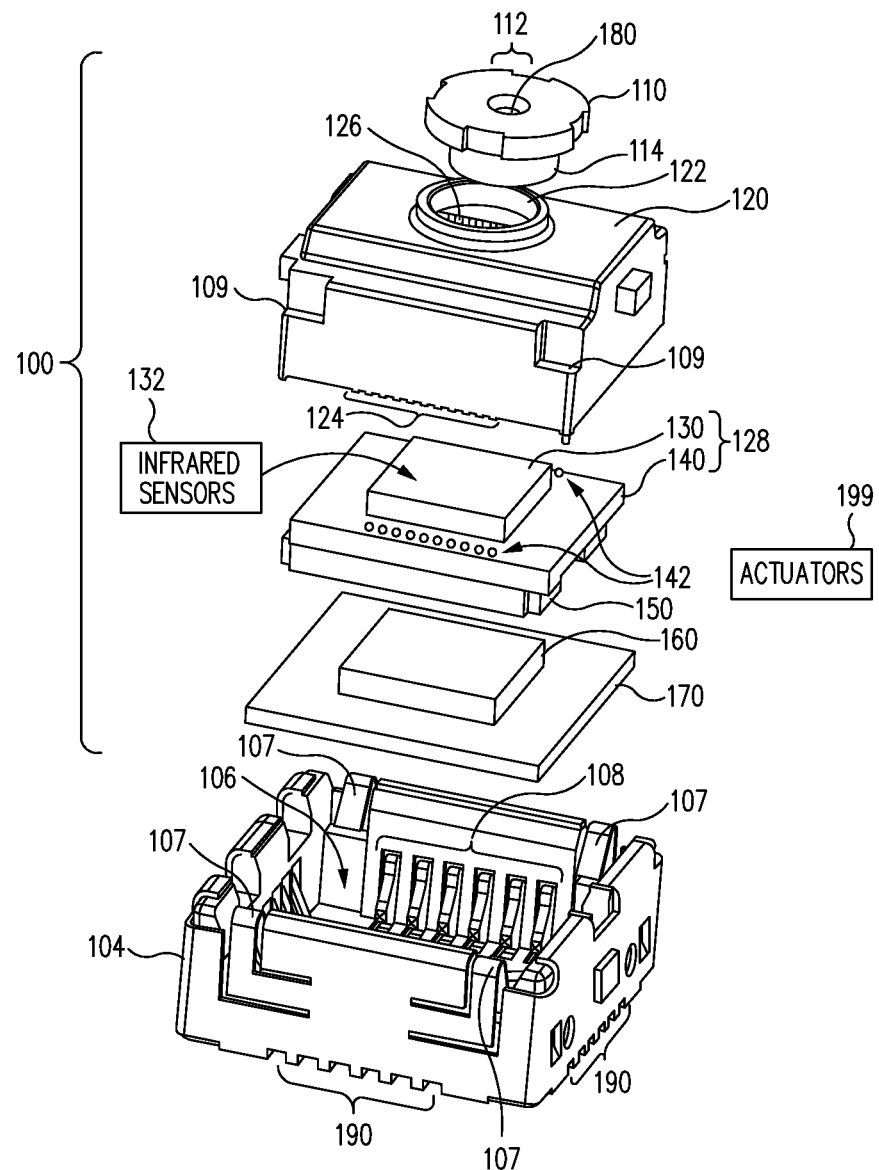
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
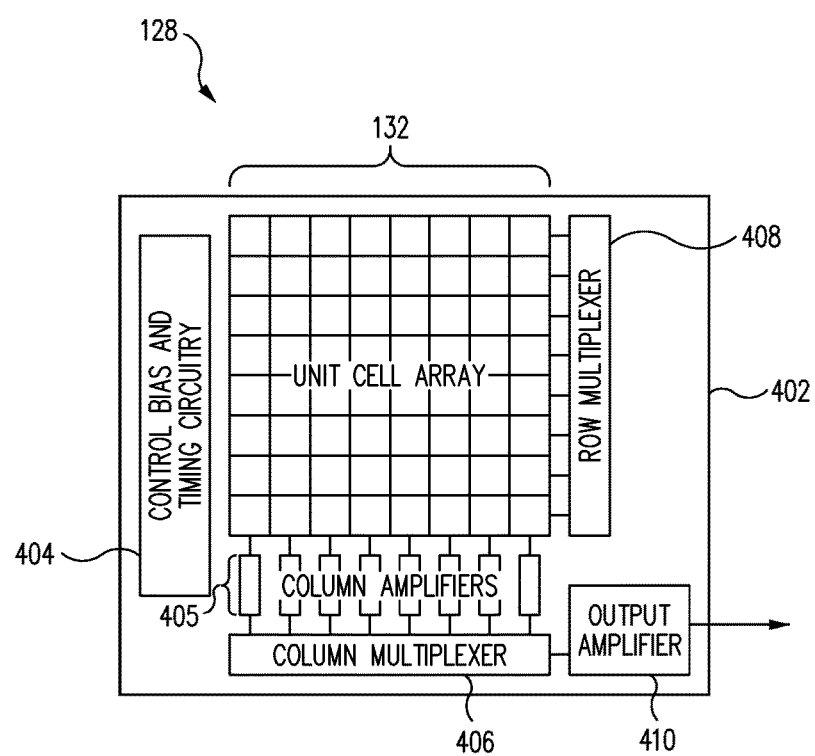
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

In some embodiments, host device 102 may include other components 198 such as a non-thermal camera (e.g., a visible light camera or other type of non-thermal imager). The non-thermal camera may be a small form factor imaging module or imaging device, and may, in some embodiments, be implemented in a manner similar to the various embodiments of infrared imaging module 100 disclosed herein, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other filters and/or sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced and/or blended with the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of such applications are incorporated herein by reference in their entirety. Any of the techniques described herein, or described in other applications or patents referenced herein, may be applied to any of the various thermal devices, non-thermal devices, and uses described herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
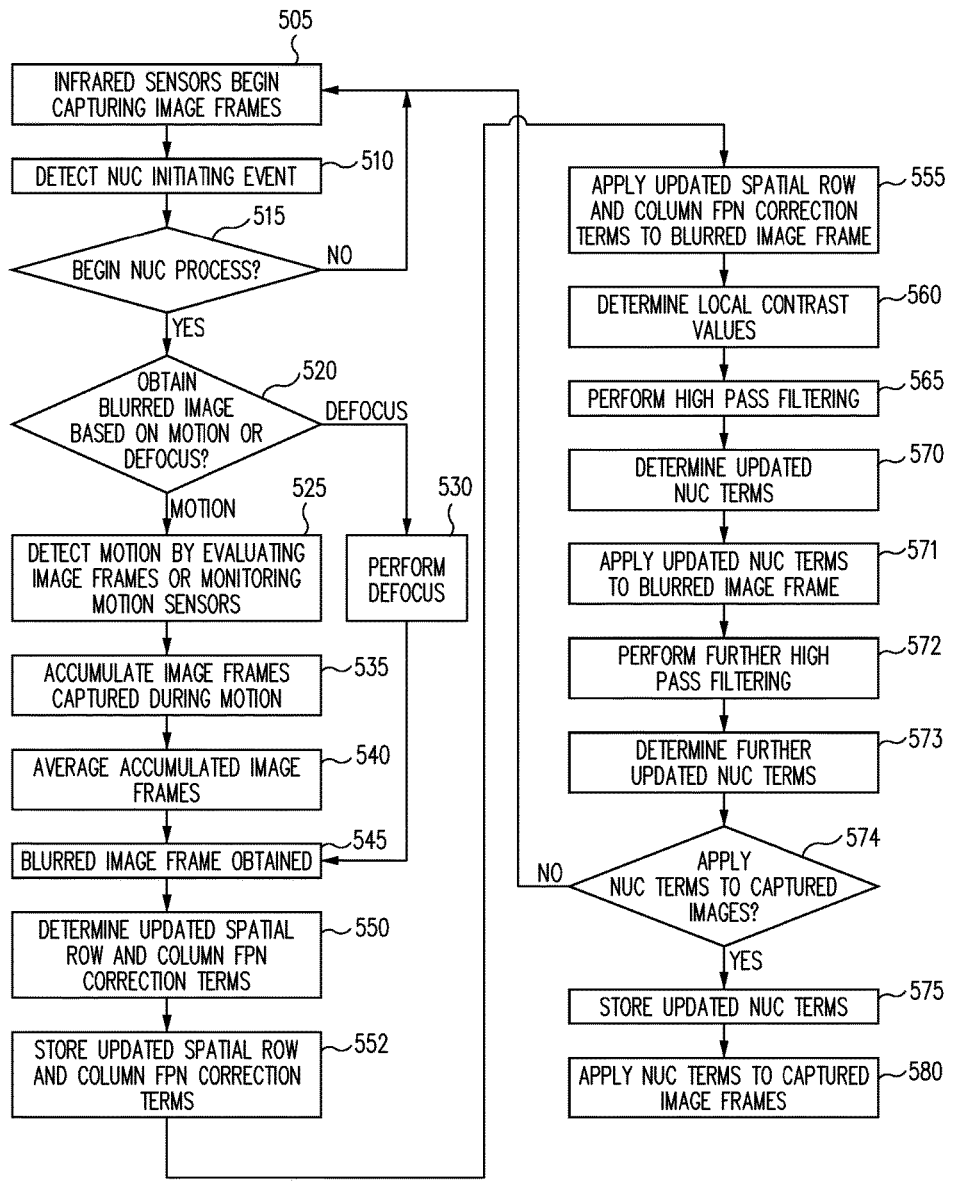
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
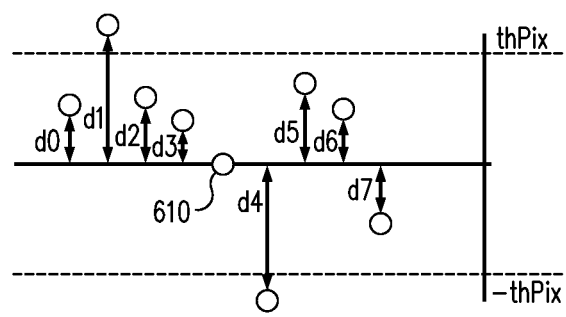
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
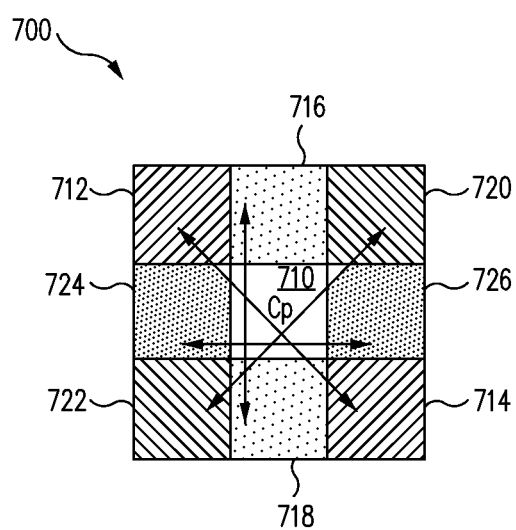
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda) \cdot (NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
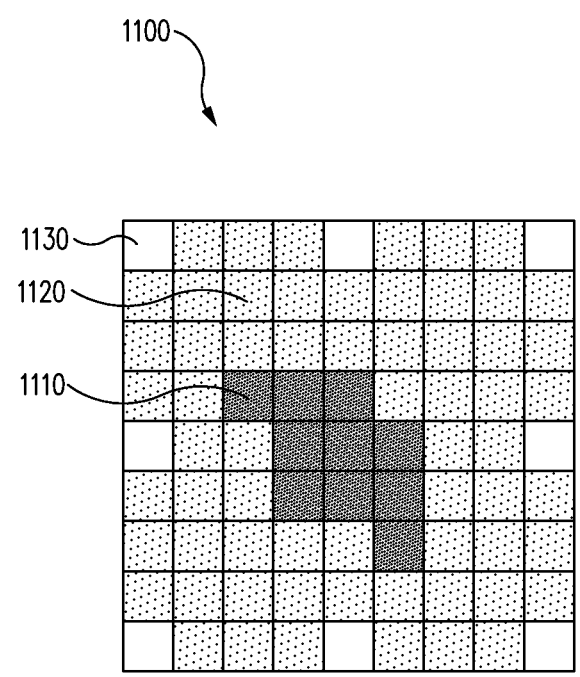
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor k may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
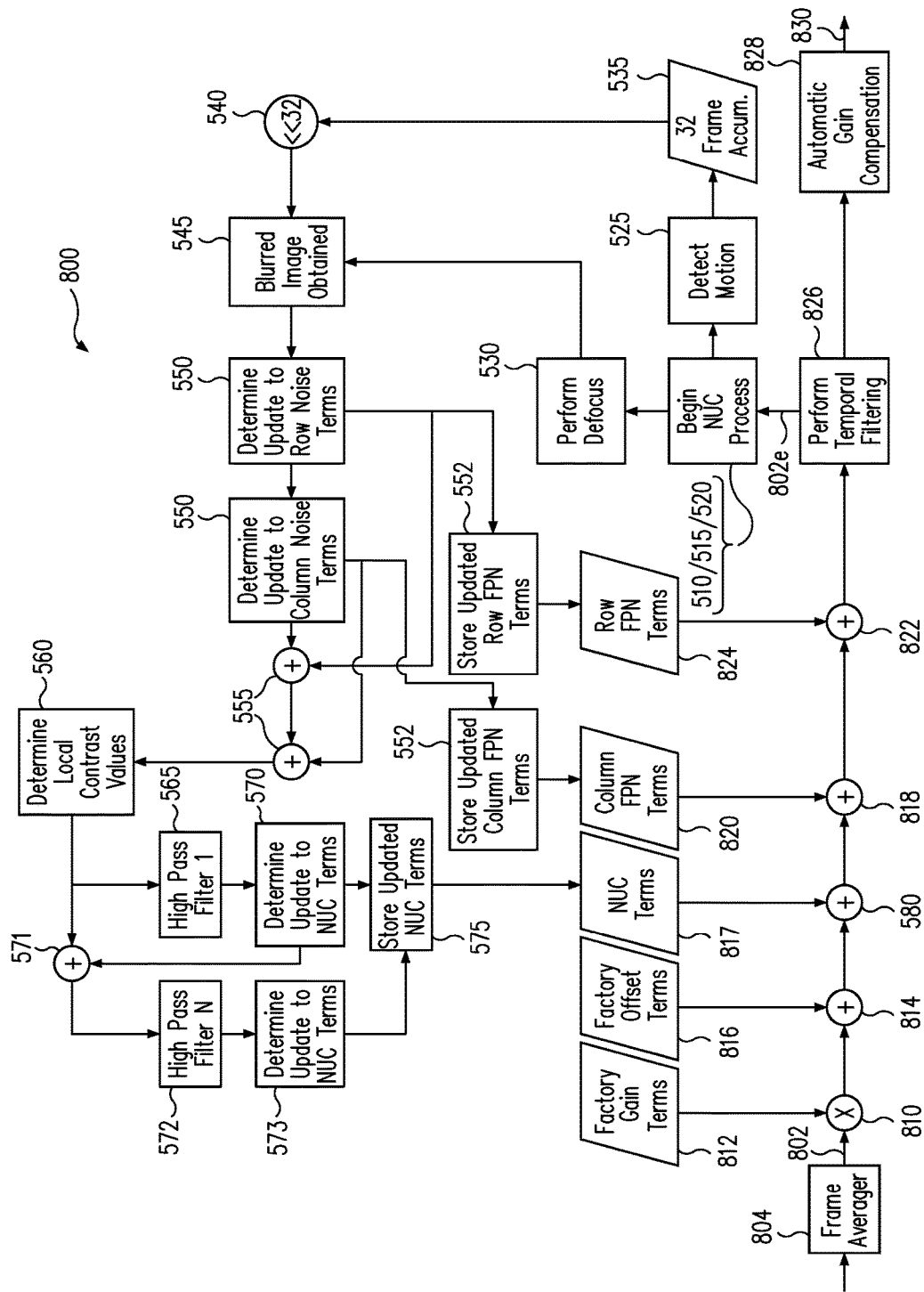
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 filed Jun. 10, 2011 which is incorporated herein by reference in its entirety.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
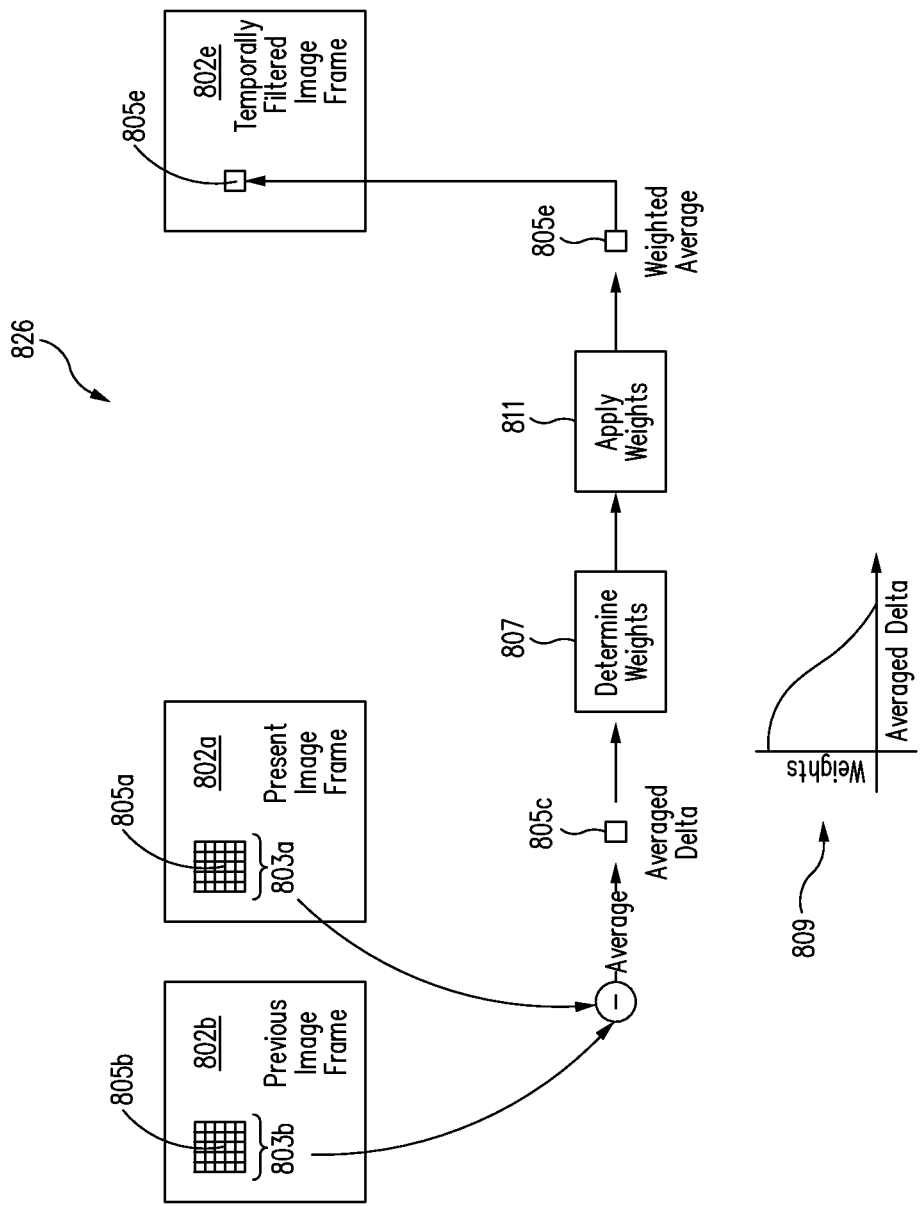
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
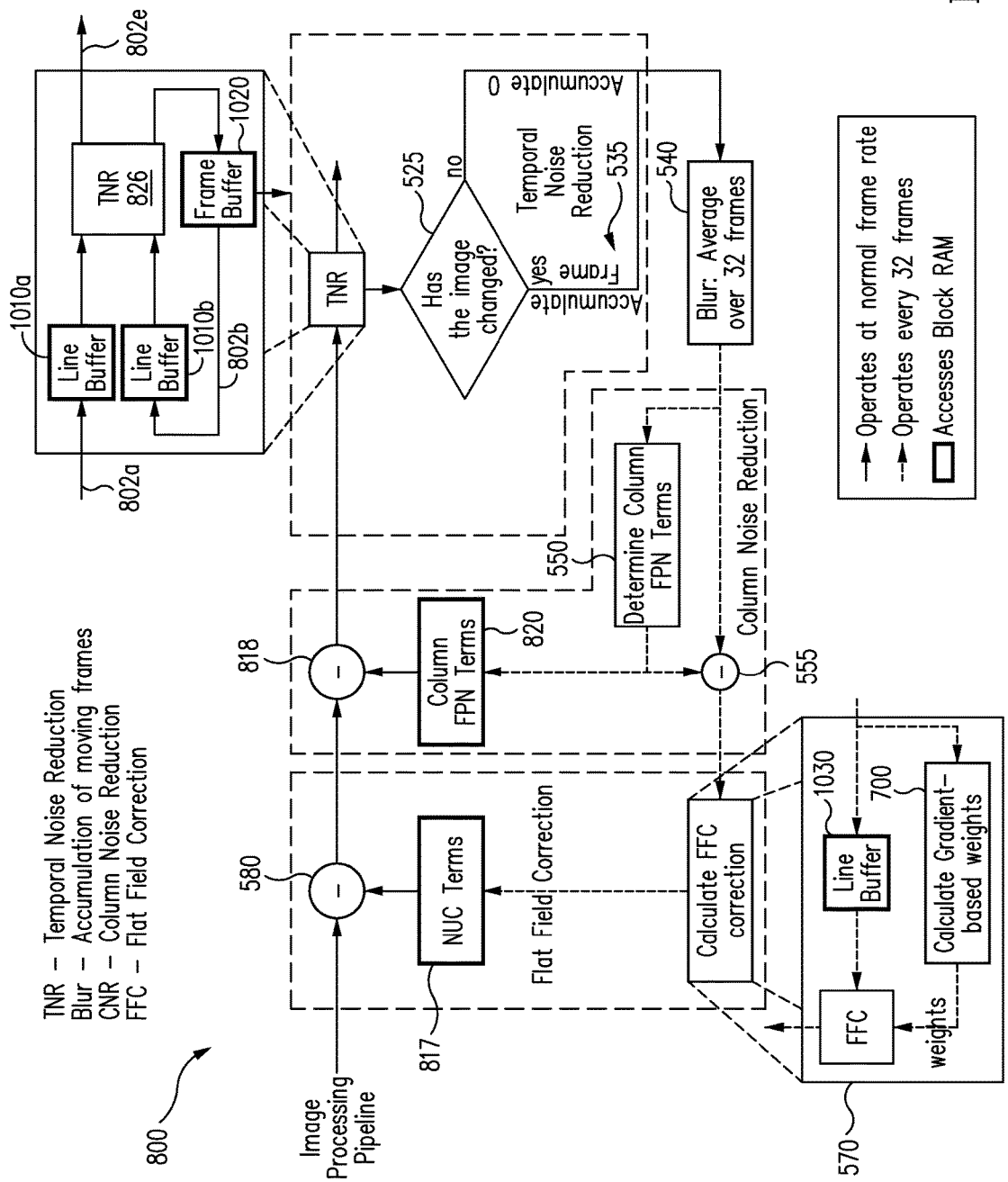
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
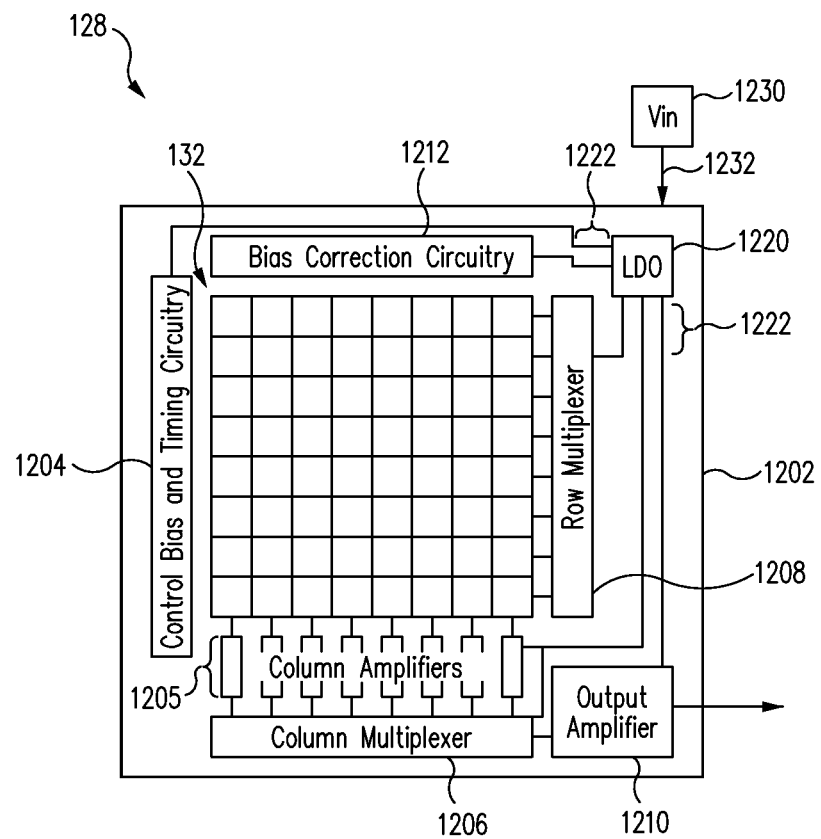
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROIC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230, in accordance with various techniques described in, for example, U.S. patent application Ser. No. 14/101,245 filed Dec. 9, 2013 incorporated herein by reference in its entirety.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.8, 2.5, 2.4, and/or lower voltages in various embodiments). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
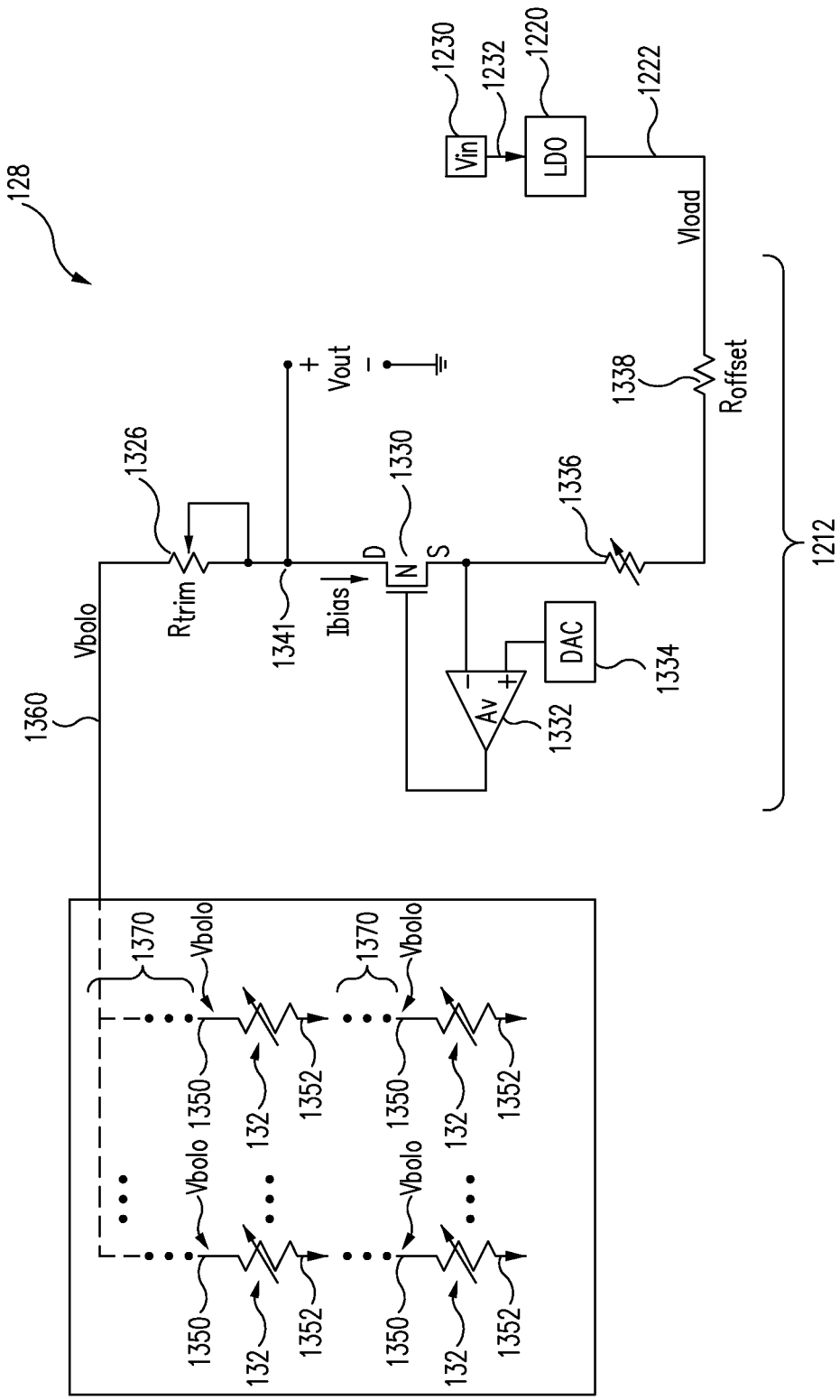
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROIC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manner described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 filed Jun. 10, 2011 incorporated herein by reference in its entirety.

Figure 14:
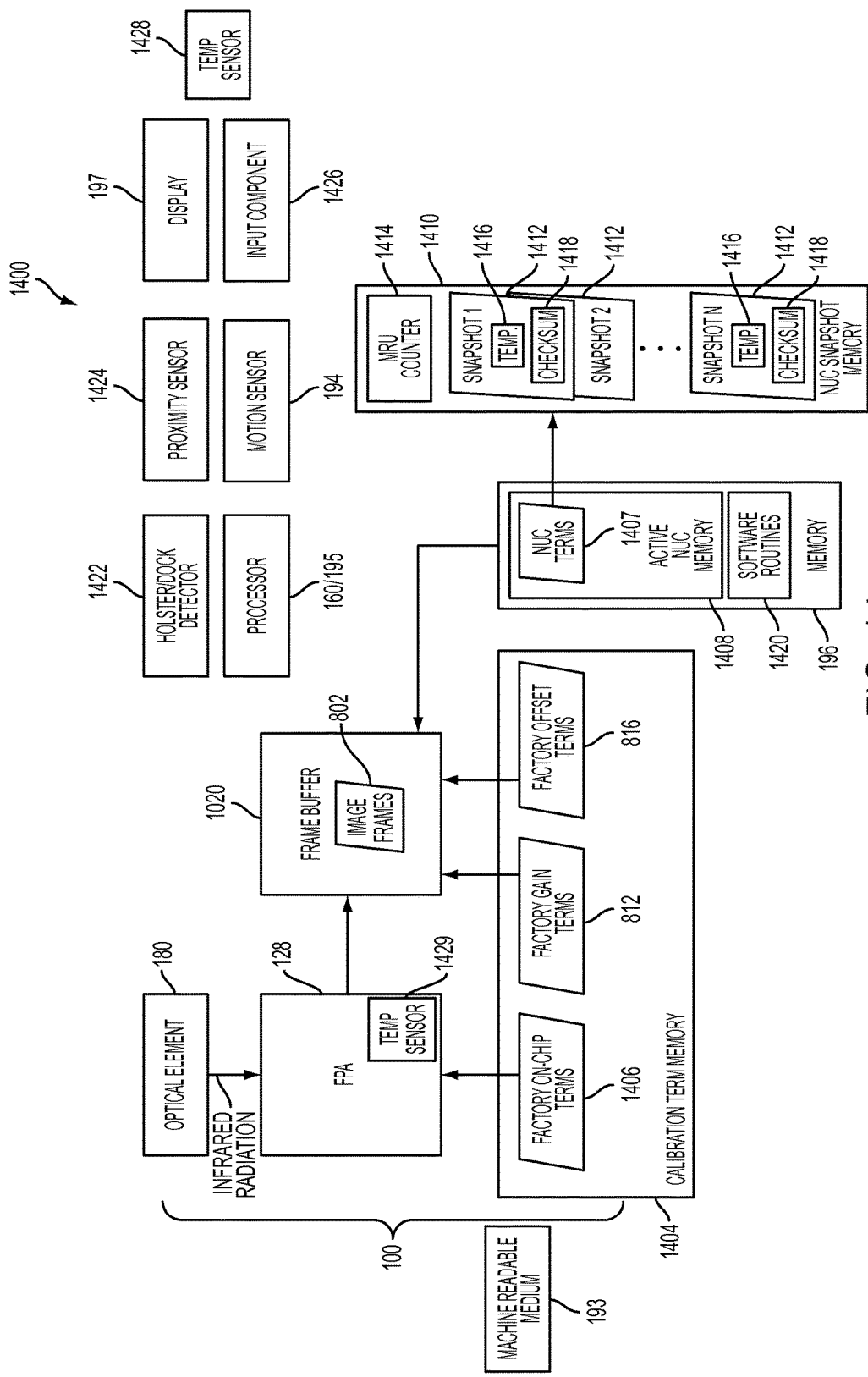
FIG. 14 illustrates a block diagram of a device to capture and/or process infrared images in accordance with an embodiment of the disclosure.

FIG. 14 illustrates a block diagram of a device 1400 to capture and/or process infrared images (e.g., digital still images or video), in accordance with an embodiment of the disclosure. For example, device 1400 may be implemented in a similar manner as host device 102 (e.g., an infrared camera, a mobile phone equipped with an infrared imaging device, or other devices having an infrared imaging device or module) comprising infrared imaging module 100. In various embodiments, device 1400 may be configured to store and apply various calibration terms to captured image frames 802 and/or to the FPA (e.g., infrared sensor assembly 128) of infrared imaging module 100, so as to compensate for non-uniformities in gain and offset or otherwise reduce noise introduced by infrared imaging module 100. In general, such calibration terms may be obtained by performing a calibration procedure and then stored in a non-volatile memory during manufacturing and/or testing of infrared imaging module 100, and thus are often also referred to as "factory terms" (e.g., factory gain terms 812, factory offset terms 816, and/or other terms) or "non-volatile terms."

In various embodiments, device 1400 may be configured to perform various shutterless NUC processes, including those described above, to further reduce noise introduced by infrared imaging module 100. As described above, the various shutterless NUC processes may be performed during or after capturing image frames of a scene, to obtain NUC terms using the image frames captured of the scene (e.g., obtain NUC terms through scene-based techniques). As such, the obtained NUC terms through such processes are often also referred to as scene-based NUC (SBNUC) terms.

In various embodiments, device 1400 may be configured to obtain NUC terms through various other NUC techniques as well. For example, in various embodiments, device 1400 may be configured to obtain NUC terms using image frames captured of a substantially uniform scene provided by a holster for device 1400, a case for device 1400, a lens cap, or other suitable object (e.g., also referred herein as a "virtual shutter"). Advantageously, such virtual shutter NUC processes may be performed with fewer image frames and/or fewer iterations than typical SBNUC processes to obtain effective NUC terms, while still not requiring an embedded calibration shutter mechanism.

In general, NUC terms obtained through NUC techniques during or after image capture operations may be applied to captured image frames after the calibration terms (factory/non-volatile terms) are applied to the captured image frames and/or to the FPA. Thus, the calibration terms may be used to correct non-uniformities or otherwise reduce noise upon a startup (e.g., power-on or activation) of infrared imaging module 100, while the NUC terms may be obtained, updated, and/or refined using actual scenes during image acquisition operations of infrared imaging module 100 after the startup to further correct non-uniformities or otherwise reduce noise. However, as discussed above, the calibration terms may become stale (e.g., no longer effective at reducing noise) with the passage of time after the calibration terms were obtained, due to calibration drifts and/or other factors.

Accordingly, in various embodiments, device 1400 may be adapted to compensate for and/or update stale calibration terms to beneficially provide better noise reduction, for example, right from a startup of infrared imaging device 100 and/or in a shorter time (e.g., less iterations) for NUC processes to effectively reduce noise. Advantageously, in various embodiments, device 1400 may be adapted to compensate for and/or update stale calibration terms without using an embedded calibration shutter mechanism. For example, various components of device 1400 may be adapted to perform all or part of processes further described herein to compensate for and/or update stale calibration terms.

In various embodiments, device 1400 may include infrared sensor assembly 128 (e.g., a FPA), frame buffer 1020, a calibration term memory 1404, processor 160/195, memory 196, a NUC snapshot memory 1410, motion sensor 194, an in-holster mode detector 1422, a proximity sensor 1424, display 197, an input component 1426, and/or a temperature sensor 1428. In various embodiments, components of device 1400 may be implemented in the same or similar manner as corresponding components of host device 102 of FIG. 1.

Infrared sensor assembly 128, which in some embodiments may be included in device 1400 as part of infrared imaging module 100, may be adapted to capture infrared image frames 802 of a scene as described above, and provide the captured image frames 802 to frame buffer 1020. Frame buffer 1020 may be implemented using any suitable memory device or buffer circuitry adapted to store image frames 802, and in some embodiments, may be implemented as part of infrared sensor assembly 128, frame averager 804, processor 160/195, memory 196, and/or any other appropriate component of device 1400. In other embodiments, frame buffer 1020 may be implemented at a separate memory device or buffer. For example, as described above with respect to FIG. 8, various NUC terms 1407 (e.g., including NUC terms 817, column FPN terms 820, and/or row FPN terms 824) may be applied to image frames 802 stored in frame buffer 1020 using appropriate operations (e.g., operations of blocks 580, 818, and/or 822). Although NUC terms 817, column FPN terms 820, and/or row FPN terms 824 of FIG. 8 may have been given above as examples, NUC terms 1407 for various embodiments may represent any appropriate NUC terms obtained through any suitable NUC technique (e.g., including a virtual-shutter NUC technique disclosed herein).

In various embodiments, NUC terms 1407 to be applied to image frames 802 may be stored and updated in an active NUC term memory 1408. In the illustrated embodiment of FIG. 14, active NUC memory 1408 may be implemented by a block of RAM provided by memory 196. However, in other embodiments, active NUC memory 1408 may be implemented using any appropriate memory block provided by any other appropriate component of device 1400 or by a separate component, which may be suitable for accessing, updating, storing, and/or otherwise utilizing NUC terms 1407 according to particular NUC techniques utilized for device 1400. Thus, for example, NUC terms 1407 stored in active NUC memory 1408 may be applied to image frames 802, accessed, updated, refined, and/or otherwise utilized according to various embodiments of shutterless NUC techniques described herein.

In various embodiments, NUC terms 1407 stored, updated, refined, and/or otherwise utilized in active NUC memory 1408 may be copied and stored as one or more snapshots 1412 of NUC terms in NUC snapshot memory 1410. In some embodiments, device 1400 may utilize a plurality of snapshots 1412. In this regard, according to some embodiments, a most recently used (MRU) counter 1414 may be stored in NUC snapshot memory 1410 or in other appropriate components of device 1400 to indicate which one of the snapshots 1412 is most recently used and/or to indicate which one of the snapshots 1412 may be utilized next to store NUC terms from active NUC memory 1408. Any appropriate data structure may be utilized to implement snapshots 1412 in NUC snapshot memory 1410. For example, in various embodiments, snapshots 1412 may be implemented using a ring buffer, circular queue, table, linked list, tree and/or other suitable structure for storing and maintaining multiple versions of data in a certain order. In some embodiments, other counters or timestamps instead of or in addition to MRU counter 1414 may be utilized as appropriate for particular data structure(s) implementing snapshots 1412. In some embodiments, device 1400 may utilize one snapshot 1412, and thus may not need MRU counter 1414.

In various embodiments, snapshots 1412 may each include a temperature reading 1416, a checksum 1418, and/or other information associated with the stored NUC terms. For example, temperature reading 1416 may indicate an approximate temperature of infrared sensor assembly 128 (e.g., using a temperature sensor 1429 embedded in infrared sensor assembly 128 to detect a temperature associated with substrate 140) when NUC terms were stored in snapshot 1412. Temperature reading 1416 may be utilized, for example, in selecting an appropriate one of snapshots 1412 to use as active NUC terms as further described herein. Checksum 1418 may be generated according to conventional methods on all or part of NUC terms as appropriate, and utilized, for example, to verify whether snapshots 1412 are corrupt or not. In some embodiments, temperature reading 1416 and/or checksum 1418 may be stored in a separate data structure.

In some embodiments, NUC snapshot memory 1410 may be implemented with one or more non-volatile memories adapted to retain information stored therein without external power, so that snapshots 1412 may be written as often as necessary while device 1400 is operating and still available to device 1400 when device 1400 is powered on again after having been powered off. For example, in one embodiment, NUC snapshot memory 1410 may be implemented using a flash memory or other suitable solid-state storage memories. In another example, NUC snapshot memory 1410 may be implemented using a storage medium drive such as a hard disk drive. In some embodiments, any suitable combination of such devices may be utilized to implement NUC snapshot memory 1410. In some embodiments, NUC snapshot memory 1410 may be implemented as part of calibration term memory 1404 further described herein or as part of any other appropriate component of device 1410. For example, in one embodiment, NUC snapshot memory 1410 may be implemented as a block of RAM provided by any appropriate component of device 1410. In such an embodiment, the block of RAM implementing NUC snapshot memory 1410 may be adapted to retain snapshots 1412 and/or other related data structures even when infrared imaging device 100 and/or infrared sensor assembly 128 is not active (e.g., powered off, suspended, or otherwise not actively performing image capturing operations). In other embodiments, NUC snapshot memory 1410 may be implemented as a separate component.

In some embodiments, factory gain terms 812 and/or factory offset terms 816 may be applied to image frames 802 stored in frame buffer 1020 using appropriate operations (e.g., operations of blocks 810 and/or 814). As described above, factory gain terms 812 and/or factory offset terms 816 may be generally referred to as calibration terms, and may be obtained using a calibration procedure performed in accordance with various processes described in U.S. Pat. Nos. 6,028,309 and 6,812,465, and U.S. Provisional Patent Application No. 61/495,888 previously referred herein, or other suitable calibration processes.

In various embodiments, factory gain terms 812 and/or factory offset terms 816 may be stored in calibration term memory 1404, which may be implemented using one or more non-volatile memories adapted to retain information stored therein without external power. For example, in one embodiment, calibration term memory 1404 may be implemented using a flash memory or other suitable solid-state storage memories. In another example, calibration term memory 1404 may be implemented using an erasable programmable read-only memory (EPROM) or other similar devices, which may be programmed (e.g., written with data) for a limited number of times (e.g., several to dozen times in some devices). In another example, calibration term memory 1404 may be implemented using a magnetic or optical storage medium drive such as a hard disk drive, wherein calibration terms stored therein may be temporary transferred to other type of memory (e.g., a RAM) before being applied, in some embodiments.

In some embodiments, any suitable combination of such devices may be utilized to implement calibration term memory 1404. In some embodiments, calibration term memory 1404 may be implemented at infrared sensor assembly 128 (e.g., as part of the ROIC). In other embodiments, calibration term memory 1404 may be implemented separately from infrared sensor assembly 128. In some embodiments, calibration term memory 1404 and infrared sensor assembly 128 may both be implemented as part of infrared imaging module 100 included in device 1400.

In various embodiments, factory on-chip terms 1406 may also be stored in calibration term memory 1404. Factory on-chip terms 1406 may be applied to infrared sensor assembly 128 rather than to image frames 802, to adjust various variable components (e.g., circuitry associated with infrared sensors 132) of infrared sensor assembly 128 to correct non-uniformities or otherwise reduce noise. Thus, depending on particular implementations of infrared sensor assembly 128, factory on-chip terms 1406 may be applied to adjust or otherwise control variable resistors, digital-to-analog convertors (DACs), biasing circuitry, and/or other components. Factory on-chip terms 1406 may also be obtained and stored in accordance with various suitable calibration procedures, such as for example those described in U.S. Pat. Nos. 6,028,309 and 6,812,465, and U.S. Provisional Patent Application No. 61/495,888 previously referred herein.

As discussed above, processor 160/195 may represent processing module 160, processor 195, or both. In various embodiments, processor 160/195 may include various hardware and/or software modules adapted to perform various operations to compensate for and/or update calibration terms (e.g., factory on-chip terms 1406, factory gain terms 812, factory offset terms 816, and/or other calibration terms) as further described herein. In some embodiments, all or part of the software modules may be machine-executable software instructions stored in a separate machine-readable medium 193 and downloaded or otherwise transferred from such machine-readable medium 193 to device 1400 (e.g., as software routines 1420 in memory 196) for execution by processor 160/195. For example, the machine-executable software instructions may be executed by processor 160/195 to perform various processes described below. In some embodiments, processor 160/195 may include hardware logic (e.g., implemented with circuits, reconfigurable logic, and/or other electronic components) configured to perform various processes described below. In some embodiments, some operations of the various processes described below may be performed by hardware logic of processor 160/195 while other operations of the processes may be performed by executing software instructions.

In some embodiments, device 1400 may include in-holster mode detector 1422 (also referred to as a dock mode detector) adapted to detect whether device 1400 is holstered, docked, or otherwise attached to or placed into an external device (e.g., a holster, dock, carrying case, connector, or other device) to be transported, to charge battery, transfer data, and/or otherwise not actively capture images but with power still on. For example, device 1400 may be implementing a mobile phone having infrared imaging module 100, which can be holstered in a conventional mobile phone holster when not in active use, docked to a mobile phone docking station, and/or placed in a mobile phone case. Accordingly, in-holster mode detector 1422, in a mobile phone or other applications of device 1400, may be implemented using conventional and/or existing connectors with electrical load sensing circuitry, proximity sensors, electromechanical switches, and/or other components adapted to detect when device 1400 (e.g., a mobile phone) is holstered, docked, or otherwise placed as described above. In some embodiments, in-holster mode detector 1422 may be utilized to determine whether to initiate a virtual-shutter NUC procedure to obtained NUC terms according to one or more embodiments of processes further described below.

In some embodiments, device 1400 may include proximity sensor 1424 adapted to detect a presence of an object in close proximity to device 1400 (e.g., in front of a lens of infrared imaging module 100). Proximity sensor 1424 according to some embodiments may be implemented with various transducer-type sensors that may be adapted to detect nearby objects without physical contact. Such sensors may include, for example, infrared proximity sensors, ultrasonic proximity sensors, Doppler-effect sensors, inductive sensors, capacitive sensors, and/or other suitable sensors. In other embodiments, proximity sensor 1424 may be implemented using a pressure sensor or other contact-based electromechanical sensor. According to some embodiments, proximity sensor 1424 may be utilized to determine whether a field-of-view (FOV) of infrared sensors 132 of infrared sensor assembly 128 (e.g., a FOV provided by optical element 180) is substantially blocked or not, as further described herein. In this regard, proximity sensor 1424 according to some embodiments may be positioned to suitably detect a presence of an object that may block a FOV provided by optical element 180 (e.g., a lens). For example, proximity 1424 may be positioned and utilized to detect whether a lens cap is covering optical element 180.

In some embodiments, device 1400 may include motion sensor 194 described above with respect to FIG. 1. As described above, motion sensor 194 may be utilized in various operations of shutterless NUC techniques. In some embodiments, motion sensor 194 may also be utilized to determine, for example, whether device 1400, hence infrared sensor assembly 128 capturing image frames 802, is sufficiently stable for performing an on-device calibration procedure to update calibration terms 1406/812/816 according to processes further described below.

In some embodiments, device 1400 may include display 197 described above with respect to FIG. 1. In some embodiments, display 197 may be implemented as an image display device (e.g., a liquid crystal display (LCD)) or various other types of generally known video displays or monitors, and may be utilized to present infrared images to a user, for example, so that the user may compare images processed with stored calibration terms 1406/812/816 and images processed with newly obtained calibration terms as further described herein.

In various embodiments, device 1400 may include input component 1426, which may include one or more buttons, keypads, sliders, knobs, and/or other user-activated mechanisms adapted to interface with a user and receive a user input or command (e.g., to control, adjust, and/or operate device 1400). In some embodiments, all or part of input component 1426 may be implemented as part of display 197 adapted to function as both a user input device and a display device. For example, input component 1426 may be implemented as a graphical user interface (GUI) presented on display 197 (e.g., implemented using a touch screen).

In some embodiments, device 1400 may include temperature sensor 1428 adapted to detect a temperature associated with a nearby object. For example, temperature sensor 1428 be implemented with a non-contact or contact thermometer positioned such that a temperature may be detected that may be associated with an object placed within a FOV of infrared imaging module 100. As described further herein, a temperature reading obtained using temperature sensor 1428 may be of an object serving as a virtual shutter, and may be utilized to perform a radiometric calibration to maintain a correlation between the outputs of infrared sensor assembly 128 and the measured temperature or flux.

Turning now to FIGS. 15-18, various processes to compensate for calibration drifts are illustrated in accordance with various embodiments of the disclosure. For example, all or part of processes 1500/1600/1700/1800 may be performed using one or more embodiments of device 1400 of FIG. 14 to store and use snapshots 1412 of NUC terms to compensate for calibration drifts, obtain NUC terms 1407 using a virtual shutter, update calibration terms 1406/812/816 using snapshots 1412 of NUC terms, and/or perform other operations to compensate for calibration drifts. Although processes 1500/1600/1700/1800 may be described below with respect to device 1400 as an example, it should be appreciated that other devices (e.g., cameras, mobile phones, tablet devices, or other portable electronic devices) may be suitably configured and utilized to perform all or part of processes 1500/1600/1700/1800.

Figure 15:
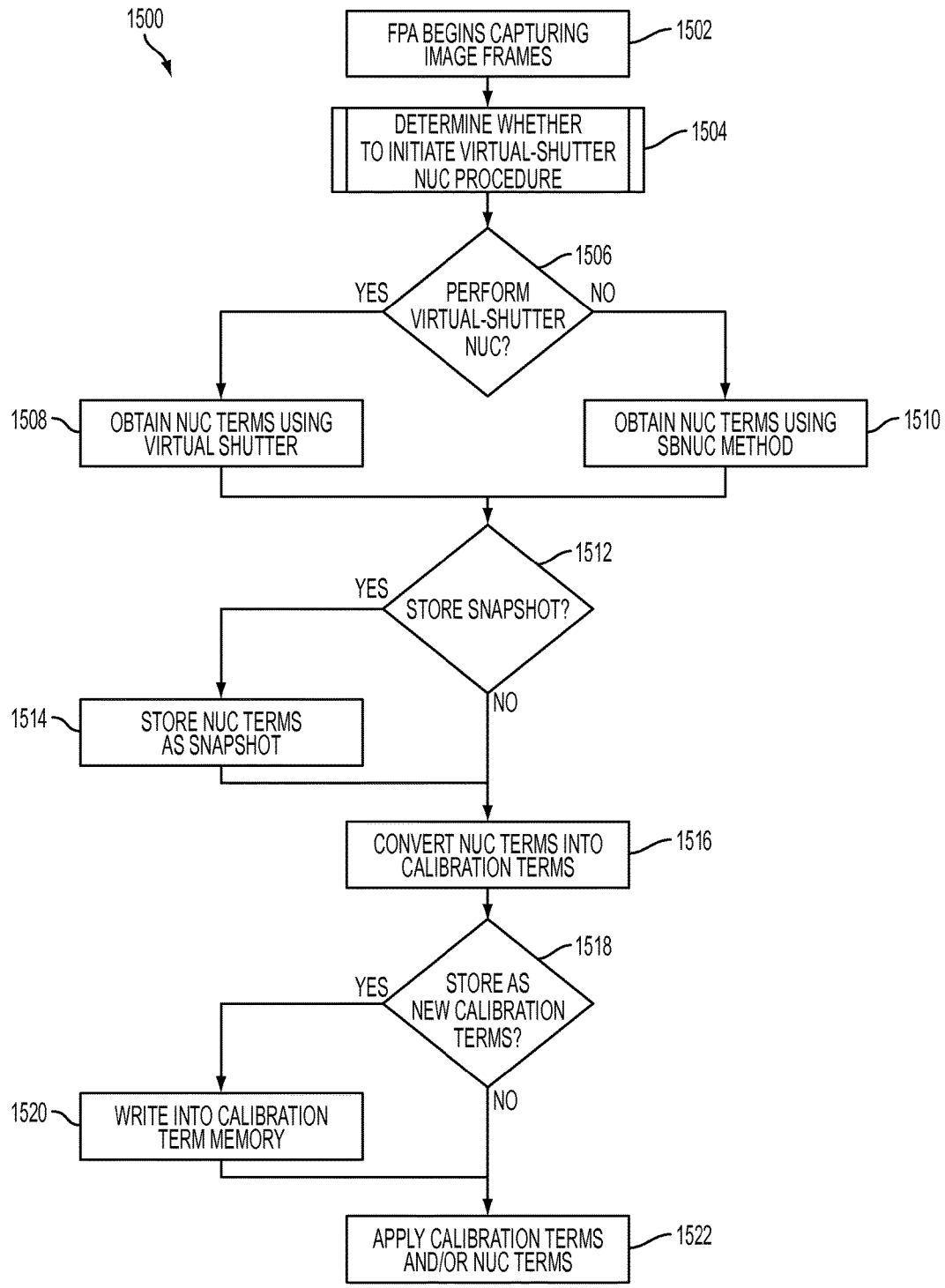
FIG. 15 illustrates a flowchart of a process to obtain non-uniformity correction (NUC) terms, store snapshots of the obtained NUC terms, and/or update calibration terms using the obtained NUC terms, in accordance with an embodiment of the disclosure.

FIG. 15 illustrates a flowchart of process 1500 to obtain NUC terms 1407, store snapshots 1412 of the obtained NUC terms 1407, and/or update calibration terms 1406/812/816 using the obtained NUC terms 1407, in accordance with an embodiment of the disclosure. At block 1502, infrared sensor assembly 128 may begin capturing image frames of a scene. For example, infrared sensor assembly 128 may capture and provide image frame 802 to frame buffer 1020 to be used for various operations further described below. In this regard, infrared sensor assembly 128 may continue capturing and providing image frames 802 during all operations shown in FIGS. 15 and 16. As discussed above, in some embodiments, factory on-chip terms 1406 may be applied to infrared sensor assembly 128 prior to or in parallel with the begin of capturing image frames 802, to correct non-uniformities or otherwise reduce noise by adjust various variable components. In some embodiments, infrared sensor assembly 128 may not need to begin capturing image frames 802 until some operations of process 1500. For example, infrared sensor assembly 128 may be turned off or otherwise inactive during block 1504 while checking for a triggering event for obtaining NUC terms 1407 using a virtual shutter as further described below. Thus, operations of 1502 may be reordered within process 1500 to begin capturing image frames 802 when appropriate without departing from the scope and sprit of the disclosure.

At block 1504, it may be determined whether or not to initiate a virtual-shutter NUC procedure to obtain NUC terms 1407. That is, various triggering events, criteria, and/or conditions may be checked to determine whether image frames 802 captured of a scene exhibiting sufficient uniformity (e.g., provided by an object acting as a virtual shutter) may be available to be used for obtaining NUC terms 1407. In this regard, according to various embodiments, operations of block 1504 may involve checking for triggering events associated with situations in which the captured image frames 802 may likely be of a sufficiently uniform scene, and/or may involve checking various conditions to determine whether the captured image frames 802 may be suitable to be used for obtaining NUC terms. For example, in accordance with various embodiments, various combinations of triggering events such as device 1400 being holstered (or docked), a FOV of optical element 180 (e.g., a lens) being substantially blocked (e.g., by a lens cover or cap), and/or a user issuing a command to perform an on-device calibration may be detected, additionally or optionally in combination with checking various conditions associated with captured image frames 802, such as whether image frames 802 contain a substantially uniform scene, whether the temperature associated with infrared sensor assembly 128 capturing image frames 802 is stable and/or suitable, and/or whether device 1400 is stable enough.

Figure 16:
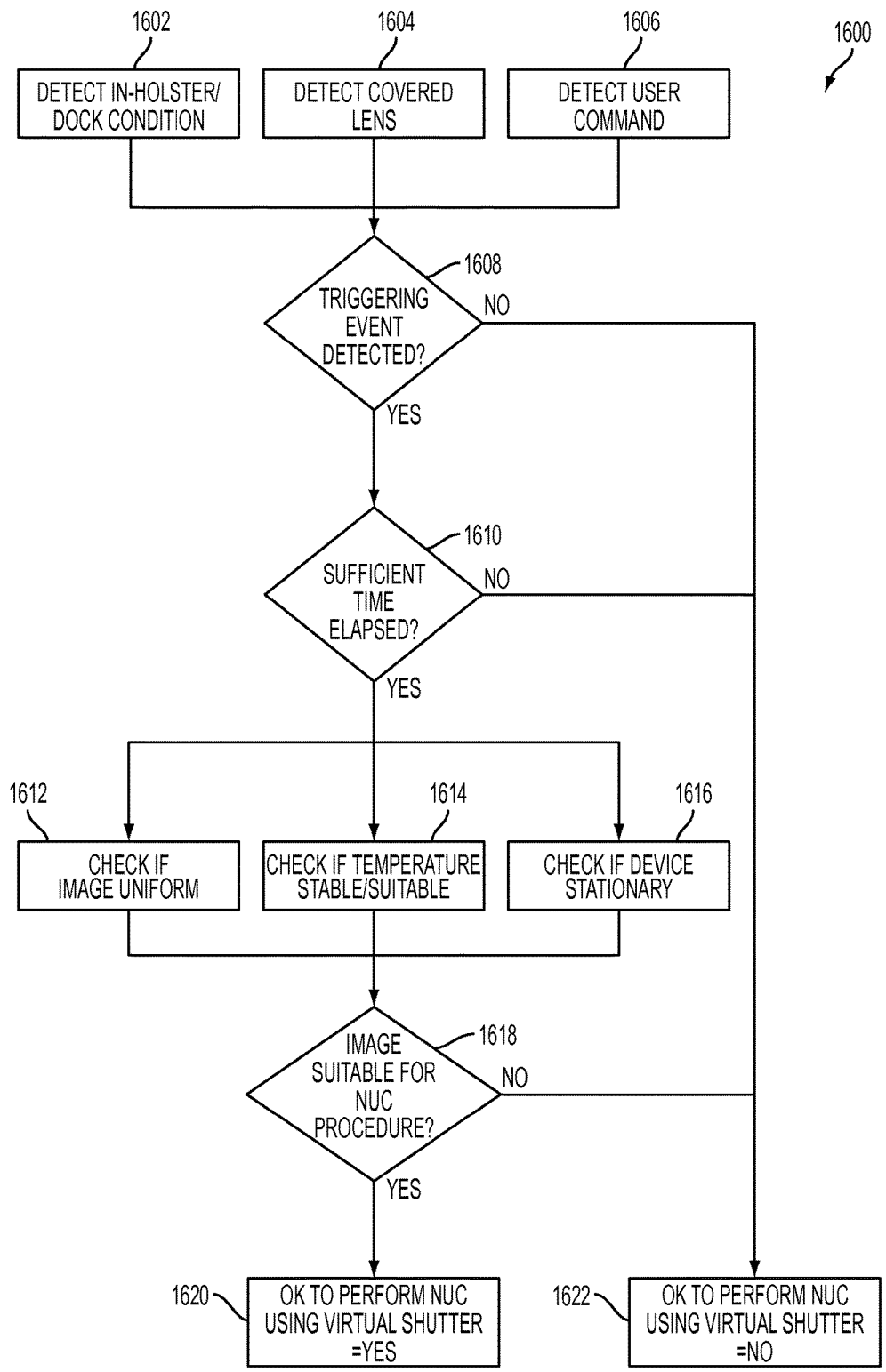
FIG. 16 illustrates a flowchart of a subprocess to determine whether to initiate a virtual-shutter NUC procedure as part of the process of FIG. 15, in accordance with various embodiment of the disclosure.

Various operations of block 1504 may be better understood with reference to FIG. 16, which illustrates process 1600 to perform block 1504 (e.g., a subprocess of block 1504 of FIG. 15) in accordance with an embodiment of the disclosure. At block 1602, an in-holster mode or dock mode of device 1400 may be detected. For example, in some embodiments, it may be detected using in-holster mode detector 1422 that device 1400 may be holstered, docked, or otherwise attached to or placed into a holster, dock, carrying case, connector, or other device, which may indicate that device 1400 may not be actively used to capture image frames. As discussed above, in some implementations, in-holster mode detector 1422 may alternatively represent or include an electro-mechanical switch, which may be used to detect, for example, a closing of a flip, slide, or lid of device 1400 (e.g., closing a flip of a mobile phone or closing of a lid on a laptop having a front-facing infrared imaging module) or other event that likely indicates a suitable situation for a virtual-shutter NUC procedure (e.g., whether or not device 1400 is actually placed in the holster or not).

In some embodiments, other indications of device inactivity (e.g., in a stand-by mode) may additionally or alternatively be checked for as a possible triggering event. In one example according to some embodiments, it may be detected, through polling, notification, or other appropriate communication with device 1400, whether a battery of device 1400 is being charged. In one or more embodiments, if it is detected that device 1400 is being charged, it may be indicated that device 1400 may likely be in a condition suitable for performing a virtual-shutter NUC procedure.

At block 1604, in parallel with block 1602 or otherwise regardless of a relative order, it may be detected that a FOV of optical element 180 is substantially blocked. For example, proximity sensor 1424 may be utilized to detect if optical element 180 (e.g., a lens of infrared imaging module 100) is substantially blocked by a lens cap, a cover, a device case, a holster, or other objects, according to some embodiments. If the FOV of optical element 180 is substantially blocked, images frames 802 captured by infrared sensor assembly may likely be uniform, for example.

At block 1606, in parallel with blocks 1602-1604 or otherwise regardless of a relative order, a user command to initiate a virtual-shutter NUC procedure may be detected. For example, a user may input or otherwise issue a command using input component 1426, which may be detected at block 1606. In another example, a user may press, toggle, or otherwise actuate a mechanical power button on device to close a lens cover (e.g., as a first power-down state) and/or to initiate a virtual-shutter NUC procedure (e.g., as a deeper power-down state). It is also contemplated that other triggering events may also be detected during process 1600 without departing from the scope and spirit of the disclosure.

At block 1608, based on detection of triggering events associated with blocks 1602-1606, process 1600 may proceed to block 1610 to continue checking other conditions, or flow to block 1624 to indicate that a virtual-shutter NUC procedure may not be initiated. According to various embodiments, blocks 1602-1606 may involve detection of one or more trigging event. Depending on particular embodiments, various combinations of such triggering events may be utilized to determine whether to initiate a virtual-shutter NUC procedure. For example, in one embodiment, detection of any one of the triggering events associated with blocks 1602-1606 may be sufficient to continue to block 1610 from block 1608. In another embodiment, combinations of triggering events, for example, to require detection of both an in-holster mode and a blocked lens view or other combinations, may be utilized to perform a decision at block 1608.

At block 1610, in some embodiments, various timers, timestamps, and/or counters may be checked to determine whether a sufficient amount of time has elapsed. For example, in some embodiments, a timer, timestamp, and/or counter may be checked that may indicate how much time (e.g., time spent in operation or real-world time) has elapsed since NUC terms 1407 were obtained using a virtual shutter. The elapsed time may be compared against predetermined thresholds or dynamic thresholds (e.g., based on a formula) to make a determination as to whether to continue with checking additional conditions or conclude that a virtual-shutter NUC procedure may not need to be initiated. Based on the determination, process 1600 may continue on to blocks 1612/1614/1616, or conclude at block 1622 that a virtual-shutter NUC procedure may not need to be initiated. In some embodiments, operations of block 1610 may be omitted or optionally performed. For example, in one embodiment, if a user command to initiate a virtual-shutter NUC procedure was detected at block 1606 (e.g., if a user manually initiated), the time elapse condition may be overridden.

As illustrated, in various embodiments, blocks 1612-1616 may be performed in parallel or in no particular order relative to one another. In various embodiments, various operations of blocks 1612-1616 may involve checking various additional conditions. For example, the various conditions checked at blocks 1612-1616 may be associated with uniformity, stability, or other standard for suitability of image frames 802 to be used for a virtual-shutter NUC procedure. In general, as described herein and elsewhere, a procedure to obtain NUC terms 1407 may involve capturing image frames of one or more uniform irradiance scenes provided by uniform black bodies, shutters, or other suitable targets. As further described herein, a virtual-shutter NUC procedure according to some embodiments of the disclosure may utilize image frames 802 that need not be of a scene provided by uniform black bodies, shutters, or other controlled targets, but rather can be of any suitable scene (e.g., a scene provided by an object acting as a virtual shutter) viewed by infrared imaging sensor 128. Accordingly, various conditions may be checked at blocks 1612-1616 to determine whether the captured image frames 802 may be of a suitable scene.

At block 1612, it may be checked whether the captured image frames 802 may be of a scene exhibiting sufficient uniformity. In some embodiments, a histogram of irradiance in image frames 802 and/or various zones within images may be generated to analyze uniformity of the scene captured in image frames 802. In some embodiments, if the irradiance level of the scene changes with time, a rate of such change may be analyzed to determine, for example, whether the scene may be suitable for obtaining gain terms as further described herein. In some embodiments, analyzing the uniformity of the scene may involve low-pass filtering or otherwise processing image frames, for example, to reduce the effect of unmitigated high-frequency spatial non-uniformities on the analysis. In some embodiments where an interaction with a user may be available (e.g., if a user issued a command to initiate an on-device calibration), process 1600 may include instructing the user to direct device 1400 so that optical element 180 (e.g., a lens) of device 1400 may view a substantially uniform object such as a wall, or to or cover optical element 180. In some embodiments, a lens cover or shutter 105 may be moved (e.g., by an actuator or motor) to a position to block external infrared radiation from entering optical element 180, for example, in response to a detection of triggering events such as holstering, docking, or closing a flip or lid of device 1400, so as to prepare device 1400 for a possible virtual-shutter NUC procedure.

At block 1614, a temperature associated with infrared sensor assembly 128 may be checked for stability and/or a range. For example, in some embodiments, a temperature change over a period or a rate of temperature change may be obtained using temperature sensor 1429 embedded in infrared sensor assembly 128 to analyze whether the temperature associated with infrared sensor assembly 128 is stable enough for calibration purposes. The temperature rate of change may be utilized, for example according to some embodiments, to determine scale factors to be applied to NUC terms 1407. Such scale factors may be determined, for example, according to one or more embodiments of processes described in U.S. patent application Ser. No. 12/391,156 filed Feb. 23, 2009, which is incorporated herein by reference in its entirety. In some embodiments, a temperature reading obtained using temperature sensor 1429 may be checked against a range of acceptable temperature (e.g., a normal operating temperature) for obtaining meaningful (e.g., corresponding to use in a normal operating temperature range) calibration terms.

At block 1616, it may be checked whether device 1400 is sufficiently stable or stationary for performing a calibration procedure. If, for example, device 1400 is being carried or otherwise in motion, it may be difficult to perform a calibration procedure (e.g., because a scene viewed by infrared sensor assembly 128 may change). Thus, in some embodiments, motion sensor 194 may be polled or otherwise utilized to determine whether device 1400 is sufficiently stable or stationary.

At block 1618, it may be determined whether image frames 802 being captured may be of a scene suitable for performing a virtual-shutter NUC procedure, based on the various conditions checked, tested, and/or analyzed at blocks 1612-1616. Based on the determination, process 1600 may proceed to block 1620 to conclude that triggering events and/or conditions likely indicate that a sufficiently uniform scene (e.g., provided by a virtual shutter) is available and thus a virtual-shutter NUC procedure may be initiated, or to block 1622 to conclude that a virtual-shutter NUC procedure may not be initiated. For example, in one embodiment, block 1618 may continue on to block 1620 if all tests, conditions, and/or criteria associated with blocks 1612-1616 are satisfied. In other embodiments, block 1618 may continue on to block 1620 if other combinations of the tests, conditions, and/or criteria (e.g., including any one of the tests, conditions, or criteria being satisfied) associated with blocks 1612-1616 are satisfied.

Thus, by performing various operations of process 1600 in accordance with various embodiments, it may be determined whether various triggering events, conditions, tests, and/or criteria are satisfied to initiate a virtual-shutter NUC procedure (e.g., reaching block 1620) or not satisfied (e.g., reaching block 1622). As may be appreciated, the various triggering events, conditions, tests, or criteria associated with process 1600 may be omitted, and/or various additional triggering events, conditions, tests, or criteria may be added as appropriate, without departing from the scope and spirit of the disclosure.

Returning to block 1506 of FIG. 15, process 1500 may selectively proceed from block 1506 to either block 1508 to start a virtual-shutter NUC procedure or block 1518 to start SBNUC operations, based on the determination at block 1504 (e.g., whether to initiate a virtual-shutter NUC procedure or not as determined by performing process 1600). At block 1508, a virtual-shutter NUC procedure may be performed to obtain NUC terms 1407. In some embodiments, the obtained NUC terms 1407 may be stored and/or updated in active NUC memory 1408 for application to image frames 802. In some embodiments, the virtual-shutter NUC procedure may involve performing a radiometric calibration using a temperature reading (e.g., provided by temperature sensor 1428) of an object or scene acting as a virtual shutter, so that pixels in image frames 802 may provide accurate temperature information.

In various embodiments, the virtual-shutter NUC procedure may be based on various processes described in U.S. Pat. Nos. 6,028,309 and 6,812,465, U.S. patent application Ser. No. 12/391,156, and U.S. Provisional Patent Application No. 61/495,888 previously referred herein or other suitable NUC processes, but appropriately modified to perform such processes without placing device 1400 in a temperature chamber and/or without providing temperature controlled uniform black bodies, shutters, and/or other suitable targets. For example, NUC terms 1407 to correct for various offsets may be obtained using a uniform irradiance scene (e.g., provided by an object or scene suitable to be used as a virtual shutter) of one irradiance level and at one ambient temperature. In general, such a procedure may be referred to as a one-point correction or flat field correction (FFC) procedure. As further described herein for some embodiments, NUC terms 1407 obtained through a virtual-shutter, one-point correction procedure may be converted or otherwise utilized to update factory on-chip terms 1406 associated with offset correction and/or factory offset terms 816 (e.g., collectively or individually also referred to as FFC terms or non-volatile FFC terms).

Optionally for some embodiments, the virtual-shutter NUC procedure may include various operations to obtain calibration data that may be converted or otherwise utilized to obtain other calibration terms 1406/812/816. For example, in some embodiments, factory gain terms 812 and/or factory on-chip terms 1406 associated with gain adjustment may also be obtained based on the calibration data obtained through the virtual-shutter NUC procedure. In one example implementation, a user may be instructed (e.g., if user interaction is possible such as when a user issued a command to initiate an on-device calibration) to direct device 1400 toward another scene or object that likely exhibits a different temperature than a previously viewed scene, so that a two-point correction may be performed to obtain calibration data that may be converted to gain terms (e.g., also sometimes referred to as FFC terms or non-volatile FFC terms). In another example, the virtual-shutter NUC procedure may include performing a two-point (or multi-point) correction procedure using image frames 802 of a scene that may be uniform yet varying in irradiance levels (e.g., as determined at block 1612 or elsewhere).

In some applications of device 1400, factory gain terms 812 and factory offset terms 816 may provide temperature-dependent correction (e.g., based on an ambient temperature of infrared sensor assembly 128). In such applications, factory gain terms 812 and factory offset terms 816 may include terms for interpolating and/or extrapolating over a temperature, such as Lagrange terms or terms for other suitable methods, as would be understood by one skilled in the art.

Accordingly, optionally for some embodiments, the virtual-shutter NUC procedure may include obtaining calibration data at different ambient temperatures, so that the obtained calibration data may be converted or otherwise utilized to obtain Lagrange terms or other appropriate interpolation/extrapolation terms. For example, in one embodiment, a user may be instructed (e.g., if user interaction is possible such as when a user issued a command to initiate an on-device calibration) to subject device 1400 to different temperatures during operations of block 1508. In another embodiment, Lagrange terms or other appropriate interpolation terms may be obtained through multiple iterations of block 1508. That is, for example, NUC terms, ambient temperature information, and/or other data may be accumulated over different iterations of block 1508 at different times (e.g., whenever triggering events are detected and/or various conditions are satisfied as determined through blocks 1504-1506 or at other times), so that Lagrange terms or other appropriate interpolation terms may be obtained using such accumulated data. The accumulation of calibration data may involve determining suitability of calibration data obtained during an iteration, for example, based on temperature spreads (e.g., whether enough temperature change has occurred as determined through operations of block 1614 or others) and/or other criteria.

Therefore, for example, by performing various operations of the virtual-shutter NUC procedure at block 1508 according to one or more embodiments, useful NUC terms 1407 may be obtained with fewer image frames and/or fewer iterations than a typical SBNUC process. Further, NUC terms 1407 and/or other calibration data obtained through one or more embodiments of the virtual-shutter NUC procedure may be utilized to potentially replace at least some of calibration terms 1406/812/816 (e.g., including non-volatile FFC terms). Advantageously, various operations of the virtual-shutter NUC procedure according to one or more embodiments may be performed without a need for a mechanical shutter embedded in infrared imaging module 100 and/or device 1400. Moreover, the virtual-shutter NUC procedure according to one or more embodiments may be automatically initiated when appropriate, such as when device 1400 is holstered, docked, covered, or otherwise is triggering an appropriate event, and/or when other appropriate conditions satisfied as discussed above.

If it is determined that the virtual-shutter NUC procedure may not be performed (e.g., due to non-occurrence of triggering events and/or unavailability of a suitable virtual shutter scene), NUC terms 1407 may instead be obtained using an appropriate SBNUC technique at block 1510. For example, SBNUC 817/820/824 terms may be obtained according to various shutterless NUC techniques described herein or in U.S. Pat. No. 8,208,755 issued Jun. 26, 2012, which is incorporated herein by reference in its entirety. Thus, in some embodiments, operations of block 1510 may include various operations described for blocks 515-573 of FIG. 5. In various embodiments, NUC terms 1407 may be stored, updated, refined, or otherwise utilized in active NUC memory 1408 during operations of block 1510, as described above with respect to FIG. 14.

Thus, according to one or more embodiments, NUC terms 1407 may be obtained through either the virtual-shutter NUC procedure or the SBNUC process depending on triggering events and/or conditions indicating the availability of an object or scene to act as a virtual shutter in the FOV of optical element 180 of device 1400. As now will be described, in various embodiments, the obtained NUC terms 1407 may be stored as one or more snapshot 1412 of NUC terms. When infrared imaging module 100 is powered on or otherwise reactivated to capture infrared images, one of the stored snapshots 1412 may be selected and used as active NUC terms 1407 so that useful (e.g., effective at reducing noise) NUC terms 1407 may be available (e.g., in active NUC memory 1408) soon after the startup of infrared imaging device 100, as described further herein. In such ways, for example, device 1400 is given a "jumpstart" to utilize useful NUC terms 1407 without having to perform many iterations of NUC processes to obtain effective NUC 1407 terms. As also described further herein, according to one or more embodiments, one or more of the stored snapshots 1412 may be selected and used to update calibration terms 1406/812/816. In such ways, for example, calibration terms 1406/812/816 may be updated without having to perform a calibration procedure.

At block 1512, it may be determined whether the obtained NUC terms 1407 (e.g., stored in active NUC memory 1408) may be stored as one of snapshots 1412 of NUC terms. In various embodiments, various criteria and/or conditions may be utilized to make the determination. For example, in some embodiments, the obtained NUC terms 1407 may be periodically stored as snapshot 1412, and thus operations of block 1512 may involve checking a timer or a real-time clock to determine whether some specified amount of time has elapsed since a previous snapshot was taken. In some embodiments, it may be determined that a snapshot should be taken of the obtained NUC terms 1407 if infrared sensor assembly 128 has experienced more than some specified amount of temperature change. In some embodiments, it may be determined that a snapshot should be taken of the obtained NUC terms 1407 if differences between the obtained NUC terms 1407 and a previously taken snapshot are greater than some specified values. In some embodiments, it may be determined that a snapshot should be taken of NUC terms 1407 if they are obtained through the virtual-shutter NUC procedure. In some embodiments, various combinations of such criteria and/or conditions may be utilized. Other criteria and/or conditions may be utilized in other embodiments.

If a determination is made at block 1512 to take a snapshot of the active NUC terms 1407, process 1500 may flow to block 1514 to store the active NUC terms 1407 as snapshot 1412. Otherwise, process 1500 may flows to block 1516. Various operations of storing NUC terms 1407 as a snapshot 1412 at block 1514 may include, according to one or more embodiments, replacing the oldest snapshot among snapshots 1412 and/or indicating that the snapshot currently being stored is the most recently stored snapshot. Such operations may be performed using MRU counter 1414 and/or other appropriate data structures as described above with respect to FIG. 14. In some embodiments, operations of block 1514 may also include storing, in snapshots 1412 along with NUC terms, temperature reading 1416 associated with infrared sensor assembly 128 and/or checksum 1418 of NUC terms, as described above with respect to FIG. 14.

Operations of blocks 1516-1520 may be performed optionally or selectively for some embodiments, and may involve converting and/or otherwise utilizing the obtained NUC terms 1407 to update calibration terms 1406/812/816. For example, in one embodiment, updates to calibration terms 1406/812/816 through operations of blocks 1516-1520 may be selectively enabled or disable according to a user input received, for example, through input component 1426. In some embodiments, updates to calibration terms 1406/812/816 through operations of blocks 1516-1520 may be performed in intervals, with a certain number of iterations of process 1500 in between where operations of blocks 1516-1520 may be omitted.

In more specific examples for some embodiments, various timers, timestamps, and/or counters may be checked to determine whether a sufficient amount of time has elapsed, such that, for example, calibration terms 1406/812/816 may likely be stale. In one embodiment, a timer, timestamp, and/or counter may be checked that may indicate how much time (e.g., time spent in operation or real-world time) has elapsed since calibration terms 1406/812/816 were updated or obtained (e.g., through a factory calibration procedure and/or a previous update using NUC terms 1407). In one embodiment, a timer, timestamp, and/or counter may be checked that may indicate how many iterations of updates to NUC terms 1407 it took to obtain acceptable NUC terms 1407 providing meaningful correction. As discussed above with respect to blocks 571-573 of FIG. 5, it may take more than one iteration of update to obtain NUC terms 1407 that satisfy one or more criteria or tests for effectiveness. As also discussed herein, as calibration terms 1406/812/816 become stale, it may accordingly take more iterations (e.g., more time after a startup of device 1400) to obtain acceptable NUC terms 1407. Thus, the number of iterations or the time it took for NUC terms 1407 to converge or stabilize to acceptable values may be indicative of how likely calibration terms 1406/812/816 are stale.

At block 1516, the obtained NUC terms 1407 may be converted into calibration terms 1406/812/816. Note that depending on particular implementations, calibration terms 1406/812/816 may include various terms that may represent different quantities, use different units, use different scaling, use different formats, and/or otherwise be different from NUC terms 1407. Accordingly, in some cases, the obtained NUC terms 1407 may need to be converted to have appropriate quantities, units, scales, and/or formats in order to be utilized for updating calibration terms 1406/812/816. In other cases, conversion operations of block 1516 embodiments may not involve more than simply copying the obtained NUC 1407 terms into appropriate data structures, and/or simply converting to conform to appropriate data structure or formatting.

For example, if factory offset terms 816 and/or factory on-chip terms 1406 contain offset values that may be applied before gain is adjusted (e.g., by applying factory gain terms 812 or by other appropriate methods), the obtained NUC terms 1407 may be scaled (e.g., by an inverse of the gain value) to correspond to offset values before gain adjustments, according to some embodiments. In some embodiments, if NUC terms 1407 utilize different resolution (e.g., number of bits), scale, or format from some of calibration terms 1406/812/816, the obtained NUC terms 1407 may be accordingly converted. As a specific example, the obtained NUC terms 1407 may be expressed in 8-bit values, which may be converted, in accordance with one or more embodiments, to 16-bit values utilized in some of calibration terms 1406/812/816.

Optionally for some embodiments, conversion operations of block 1516 may involve obtaining gain terms (e.g., factory gain terms 812) and/or interpolation terms (e.g., Lagrange terms) by converting and/or otherwise utilizing calibration data accumulated by operations of the virtual-shutter NUC procedure as described above for block 1506. For example, as described above, in some cases such terms may be obtained from calibration data accumulated for two or more ambient temperature levels and/or for two or more infrared flux levels during one or more iterations of the virtual-shutter NUC procedure.

At block 1518, it may be decided whether to use the updated (e.g., converted from the obtained NUC terms 1407) calibration terms or keep factory on-chip terms 1406, factory gain terms 812, and/or factory offset terms 816 stored in a non-volatile memory (e.g., calibration term memory 1404), by comparing the updated calibration terms with the stored calibration terms. As discussed, factory on-chip terms 1406, factory gain terms 812, and/or factory offset terms 816 stored in a non-volatile memory may have been obtained during a factory calibration procedure or a previous update through operations described herein. Thus, in various embodiments, the comparison may involve comparing the effectiveness of the newly obtained calibration terms with that of the previously obtained calibration terms 1406/812/816, so as to determine whether to replace the previously obtained calibration terms 1406/812/816 with the newly obtained calibration terms.

In some embodiments, various operations of comparing the relative effectiveness may include analyzing the new and the stored calibration terms and/or analyzing sample image frames with the new and the stored calibration terms applied respectively for comparison. For example, spatial correlation analysis, autocorrelation analysis, and/or other statistical analysis methods for quantifying noise in images (e.g., quantifying high spatial frequency content that may be indicative of graininess due to noise) may be performed on the sample image frames to determine whether the new or the stored calibration terms may be more effective in correcting non-uniformity or otherwise reducing noise. In some embodiments, if user interaction is possible such as when a user issued a command to initiate the on-device calibration, the sample image frames may be presented to the user (e.g., through display 197) so that the user may qualitatively judge the difference in the effectiveness of the newly obtained calibration terms and the stored calibration terms.

In one embodiment, the decision made at block 1518 may be based on the analysis of the sample image frames and/or the new and the stored calibration terms as described above. In another embodiment, the decision may be based on a user input received in response to the sample image frames presented to the user (e.g., on display 197) for comparison. In other embodiments, the decision may be based on various combinations of the analysis and the user input. If the newly obtained calibration terms are likely more effective and thus selected to be used, process 1500 may continue to block 1520 to write the updated calibration terms into the non-volatile memory (e.g., calibration term memory 1404) to replace corresponding terms of the stored calibration terms 1406/812/816. After updating the stored calibration terms 1406/812/816 at block 1520, or if a decision was made at block 1518 to keep the stored calibration terms, process 1500 may continue to block 1522 to apply the obtained NUC terms 1407, updated calibration terms (if generated), and/or other applicable terms.

Therefore, for example, by performing one or more embodiments of process 1500, snapshots 1412 of the obtained NUC terms 1407 may be taken that may be advantageously utilized to jumpstart infrared imaging device 100 with useful NUC terms when infrared imaging device is powered on or otherwise reactivated, and/or the obtained NUC terms 1407 may be utilized to update stale calibration terms 1406/812/816.

Figure 18:
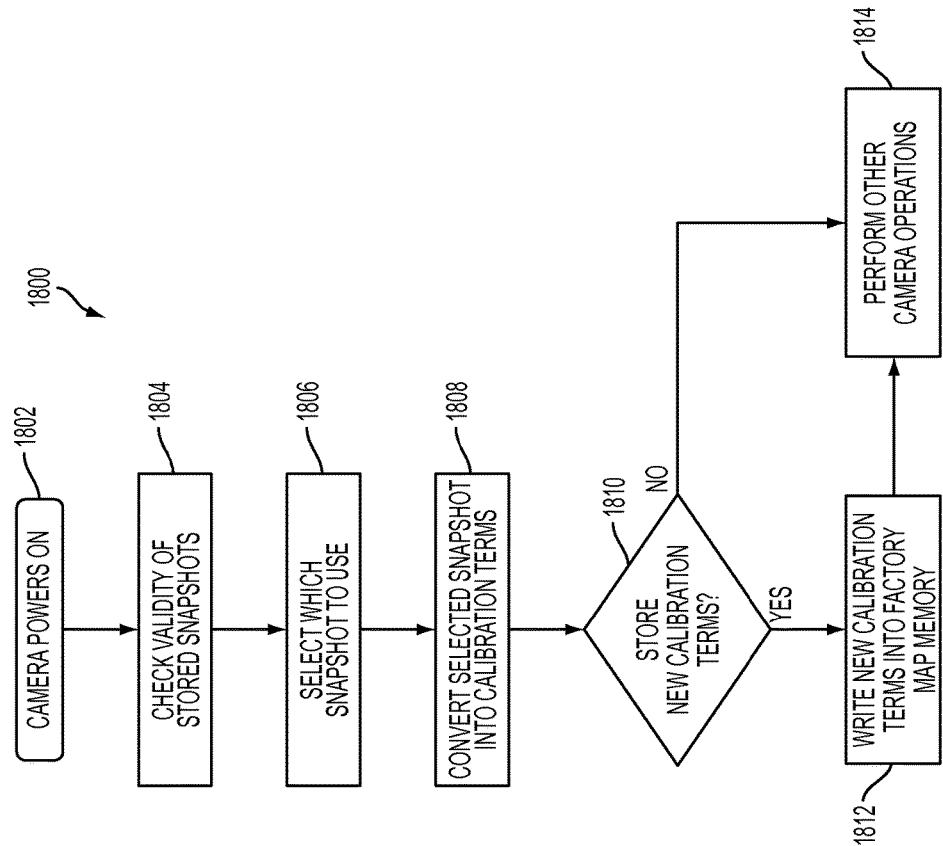
FIG. 18 illustrates a flowchart of another process to utilize the stored snapshots of the process of FIG. 15, in accordance with another embodiment of the disclosure.
Figure 17:
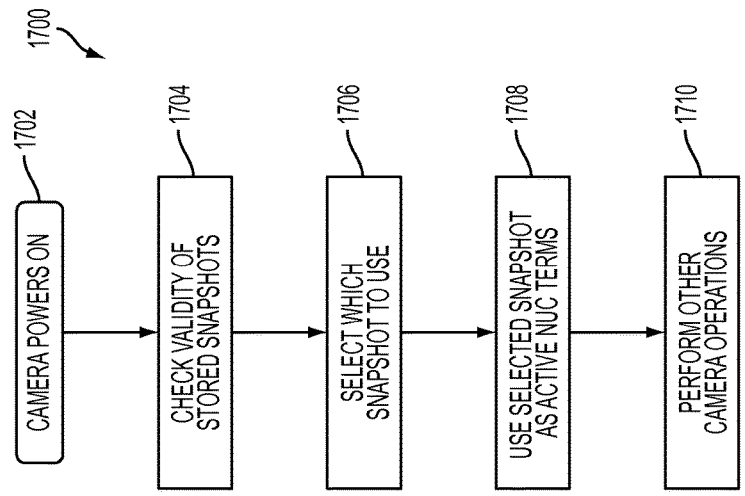
FIG. 17 illustrates a flowchart of a process to utilize the stored snapshots of the process of FIG. 15, in accordance with an embodiment of the disclosure.

FIGS. 17-18 illustrate processes 1700 and 1800 that may be performed to utilize the stored snapshots 1412 of NUC terms when infrared imaging device 100 is started up, powered on or otherwise reactivated, in accordance with various embodiments of the disclosure. More specifically, FIG. 17 illustrates process 1700 to use one of the stored snapshots 1412 as active NUC terms in accordance with an embodiment of the disclosure. Process 1700 may begin at block 1702, for example, when infrared imaging device 100 is started up, powered on, or otherwise reactivated. As may be appreciated, infrared imaging module 100 (e.g., an infrared camera or module of a mobile device) may be suspended or otherwise inactivated (e.g., not performing image capturing operations) even when device 1400 remains powered on. Thus, in some cases, process 1700 may begin when infrared imaging device 100 is reactivated from such a state.

At block 1704, validity of the stored snapshots 1412 may be checked for some embodiments. In one or more embodiments, checksums 1418 (e.g., stored as part of snapshots 1412 or in a separate data structure) associated with the stored snapshots 1412 may be utilized to verify whether the corresponding snapshot is corrupt or not. For example, if power was shut off while a snapshot was being taken, the snapshot may be corrupt or otherwise not suitable for use. Accordingly, in some embodiments, the validity of the stored snapshots 1412 may be checked to avoid using corrupt snapshots. In some embodiments, various operations of block 1704 may be performed after block 1706, on a snapshot 1412 selected through operations of block 1706.

At block 1706, one of the stored snapshots 1412 may be selected. In various embodiments, a snapshot 1412 may be selected according to various criteria and/or conditions. In one embodiment, temperature readings 1416 (e.g., stored as part of snapshots 1412 or in a separate data structure) associated with the stored snapshots 1412 may be analyzed to select a snapshot 1412, for example, one taken at an ambient temperature closest to a current ambient temperature associated with infrared sensor assembly 128. In another embodiment, a snapshot 1412 that was the most recently taken (e.g., as determined using MRU counter 1414 or other appropriate information) may be selected. In some embodiments, various combinations of such criteria and/or conditions may be utilized, for example, as a weighted combination or as a formula incorporating such criteria and/or conditions. Other appropriate criteria and/or conditions may additionally or alternatively be utilized for other embodiments.

At block 1708, the selected snapshot 1412 may be used as active NUC terms 1407. For example, in some embodiments, the selected snapshot 1412 may be written into active NUC memory 1408, so that various operations associated with a NUC process may update, refine, apply to image frames 802, or otherwise utilize NUC terms 1407 copied from the selected snapshot 1412 to active NUC memory 1408. In other embodiments, the selected snapshot 1412 may otherwise be made available for use by a NUC process or other appropriate operations. At block 1710, other operations associated with infrared imaging module 100 and/or device 1400 may be performed if applicable, with the selected snapshot 1412 used as the active NUC terms 1407. For example, various image capturing and/or processing operations provided by infrared imaging module 100 and/or device 1400 may be performed if applicable.

FIG. 18 illustrates process 1800 to use the stored snapshots 1412 to update calibration terms 1406/812/816 in accordance with an embodiment of the disclosure. Process 1800 may begin at block 1802, for example, when infrared imaging device 100 is started up, powered on, or otherwise reactivated. At block 1804, validity of the stored snapshots 1412 may be checked for some embodiments. Operations of block 1804 may be performed in a similar manner as operations of block 1704, for example. At block 1806, one or more of the stored snapshots 1412 may be selected. In some embodiments, one or more snapshots 1412 may be selected according to similar criteria and/or conditions as those described for block 1706. In some embodiments, criteria and/or conditions other than those described for block 1706 may be utilized, as further described herein.

At block 1808, the one or more selected snapshots 1412 may be converted into calibration terms. In various embodiments, operations of block 1808 may be similar to those of block 1516, except that conversion may be performed on the one or more selected snapshots 1412 rather than on the obtained NUC term 1407. In some embodiments, operations of block 1808 may involve utilizing the selected snapshots 1412 to obtain gain terms (e.g., factory gain terms 812) and/or interpolation terms (e.g., Lagrange terms). For example, as described above, in some cases such terms may be obtained from non-uniformity data associated with two or more ambient temperature levels. In this regard, according to some embodiments, gain terms and/or interpolation terms may also be obtained using two or more snapshots obtained at different temperatures. Further in this regard, the one or more snapshots 1412 may be selected at block 1806, in one embodiment, based on a temperature range or spread desired for obtaining the gain and/or interpolation terms.

Blocks 1810-1812 may be similar to blocks 1518-1520 of FIG. 15 to perform various operations to compare the converted calibration terms to previously stored calibration terms 1406/812/816, and to update the previously stored calibration terms 1406/812/816 or not based on the comparison. Block 1810 or 1812 may flow to block 1814, where other operations associated with infrared imaging module 100 and/or device 1400 may be performed if applicable.

Thus, by performing various operations of process 1700 and/or process 1800 after process 1500 according to one or more embodiments, infrared imaging device 100 may advantageously provide more effective non-uniformity correction right from a startup and/or in a shorter time (e.g., with less iterations for NUC processes to be effective) after a startup of infrared imaging device 100. It is also contemplated for some embodiments that various operations of processes 1700 and 1800 may be combined, with operations to update calibration terms 1406/812/816 being performed selectively. For example, updates to calibration terms 1406/812/816 may be performed in intervals, with a certain number of start-ups where snapshot 1412 may instead be used as active NUC terms 1407 in between. In another example, updates to calibration terms 1406/812/816 may be selectively enabled or disable according to a user input received, for example, through input component 1426.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving image frames of a scene captured by a focal plane array (FPA) of an infrared imaging device;
   detecting an external condition associated with a virtual-shutter non-uniformity correction (NUC) procedure;
   processing at least one of the image frames in response to the detected external condition to obtain NUC teams without the use of a temperature controlled black body; and
   storing the obtained NUC terms as one or more snapshots of NUC terms.

2. The method of claim 1, further comprising checking whether the stored snapshots are valid or not.

3. The method of claim 1, further comprising selecting, upon a startup of the infrared imaging device, from one or more snapshots of NUC terms to apply to the image frames captured by the FPA.

4. The method of claim 3, wherein the snapshot is selected based on a temperature associated with the snapshot and/or on recency of the snapshot.

5. The method of claim 1, wherein the infrared imaging device is adapted to store calibration terms to be applied to reduce noise introduced by the infrared imaging device prior to application of the NUC terms, the method further comprising selecting, upon a startup of the infrared imaging device, from one or more snapshots of NUC terms to update the calibration terms.

6. The method of claim 5, further comprising:
   converting the selected snapshot of NUC terms into new calibration terms; and
   storing the new calibration terms in the infrared imaging device.

7. The method of claim 6, further comprising, prior to storing the new calibration terms, comparing the new calibration terms with calibration terms previously stored in the infrared imaging device to determine whether to use the new calibration terms, wherein the storing the new calibration terms is performed or not based on the determination.

8. The method of claim 1,
   wherein the scene is a substantially uniform scene provided by an external object acting as a virtual shutter.

9. The method of claim 8, wherein the detecting the external condition comprises detecting that a host device comprising the infrared imaging device is holstered and/or a field-of-view of the infrared imaging device is substantially blocked.

10. The method of claim 8, wherein the detecting the external condition comprises analyzing uniformity of the image frames, a temperature associated with the infrared imaging device, and/or stability of the infrared imaging device.

11. The method of claim 1, wherein the obtaining the NUC terms comprises:
    receiving an intentionally blurred image frame of the scene; and
    processing the blurred image frame to determine the NUC tetins to reduce spatially uncorrelated fixed pattern noise (FPN) introduced by the infrared imaging device.

12. The method of claim 1, wherein the FPA comprises an array of microbolometers, the method further comprising:
    providing a bias voltage to the microbolometers selected from a range of approximately 0.2 volts to approximately 0.7 volts.

13. The method of claim 1, wherein the method is performed using components of a mobile phone, a tablet device, or a portable infrared camera.

14. A device comprising:
    an infrared imaging device comprising a focal plane array (FPA) adapted to capture image frames of a scene;
    a memory adapted to store information; and
    a processor adapted to communicate with the infrared imaging device and the memory, the processor further adapted to:
        detect an external condition associated with a virtual-shutter non-uniformity correction (NUC) procedure,
        process at least one of the image frames in response to the detected external condition to obtain NUC teens without the use of a temperature controlled black body, and
        store, in the memory, the obtained NUC terms as one or more snapshots of NUC terms.

15. The device of claim 14, wherein the processor is further adapted to check whether the stored snapshots are valid or not.

16. The device of claim 14, wherein the processor is further adapted to select, upon a startup of the infrared imaging device, from one or more snapshots of NUC terms in the memory to apply to the image frames captured by the FPA.

17. The device of claim 16, wherein the snapshot is selected based on a temperature associated with the snapshot and/or on recency of the snapshot.

18. The device of claim 14, further comprising a non-volatile memory adapted to store calibration terms to be applied to reduce noise introduced by the infrared imaging device prior to application of the NUC terms, wherein the processor is further adapted to select, upon a startup of the infrared imaging device, from one or more snapshots of NUC terms to update the calibration terms.

19. The device of claim 18, wherein the processor is further adapted to:

convert the selected snapshot of NUC terms into new calibration terms; and store the new calibration terms in the non-volatile memory.

20. The device of claim 19, wherein the processor is further adapted to:

compare the new calibration terms with calibration terms previously stored in the non-volatile memory to determine whether to use the new calibration terms; and store the new calibration terms or not based on the determination.

21. The device of claim 14, wherein the scene is a substantially uniform scene provided by an external object acting as a virtual shutter.

22. The device of claim 21, wherein the processor is adapted to detect the external condition by detecting that the device is holstered and/or a field-of-view of the infrared imaging device is substantially blocked.

23. The device of claim 21, wherein the processor is further adapted to detect the external condition by analyzing uniformity of the image frames, a temperature associated with the infrared imaging device, and/or stability of the infrared imaging device.

24. The device of claim 14, wherein:

the infrared imaging device is adapted to capture an intentionally blurred image frame of the scene; and the processor is adapted to use the blurred image frame to obtain the NUC terms to reduce spatially uncorrelated fixed pattern noise (FPN) introduced by the infrared imaging device.

25. The device of claim 14, wherein the FPA comprises an array of microbolometers adapted to receive a bias voltage selected from a range of approximately 0.2 volts to approximately 0.7 volts.

26. The device of claim 14, wherein the device is a mobile phone, a tablet device, or a portable infrared camera.

* * * * *